US011461760B2

(12) United States Patent
Wilson et al.

(10) Patent No.: US 11,461,760 B2
(45) Date of Patent: Oct. 4, 2022

(54) AUTHENTICATION USING APPLICATION AUTHENTICATION ELEMENT

(71) Applicant: Visa International Service Association, San Francisco, CA (US)

(72) Inventors: David William Wilson, Camberley (GB); John Francis Benedict Bourdillon, Paddington (GB); Christian Aabye, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 719 days.

(21) Appl. No.: 15/849,489

(22) Filed: Dec. 20, 2017

(65) Prior Publication Data

US 2018/0139608 A1 May 17, 2018

Related U.S. Application Data

(63) Continuation of application No. 13/428,431, filed on Mar. 23, 2012, now Pat. No. 9,883,387.
(Continued)

(51) Int. Cl.
*G06Q 20/32* (2012.01)
*H04L 9/40* (2022.01)
(Continued)

(52) U.S. Cl.
CPC ....... *G06Q 20/3226* (2013.01); *G06Q 20/325* (2013.01); *G06Q 20/3227* (2013.01);
(Continued)

(58) Field of Classification Search
CPC .................. H04L 63/0807; G06Q 20/40145
(Continued)

(56) References Cited

U.S. PATENT DOCUMENTS 7,865,937 B1 1/2011 White et al.
8,107,921 B2 * 1/2012 Fiatal .................... H04M 15/51
455/406

(Continued)

OTHER PUBLICATIONS

White, How Computers Work 7th Ed, p. 4 (Year: 2003).*
(Continued)

*Primary Examiner* — Mohammad A. Nilforoush
*Assistant Examiner* — Cristina Owen Sherr
(74) *Attorney, Agent, or Firm* — Kilpatrick Townsend & Stockton LLP

(57) ABSTRACT

Systems, apparatuses, and methods for performing transactions through mobile communication devices using either telecommunications networks or proximity near-field communications systems are disclosed. A mobile communication device may display an application authentication element. The application authentication element may include a pre-selected authentication element and transaction data associated with a transaction conducted by a mobile communication device. The mobile communication device may obtain the pre-selected authentication element by either transmitting a request to a server computer or retrieving the pre-selected authentication element from a secure memory in the mobile communication device. A user authentication token may be received by the mobile communication device from the user. The mobile communication device may generate a secret token that is derived from the user authentication token. If the secret token is correlated to a secret reference token, then a transaction may be conducted.

18 Claims, 15 Drawing Sheets

Related U.S. Application Data

(60) Provisional application No. 61/467,106, filed on Mar. 24, 2011.

(51) Int. Cl.
    *G06Q 20/40*     (2012.01)
    *H04W 12/062*     (2021.01)

(52) U.S. Cl.
    CPC ..... *G06Q 20/3229* (2013.01); *G06Q 20/3278* (2013.01); *G06Q 20/40145* (2013.01); *H04L 63/0807* (2013.01); *H04W 12/062* (2021.01)

(58) Field of Classification Search
    USPC .......................................................... 705/67
    See application file for complete search history.

(56) References Cited

U.S. PATENT DOCUMENTS

| | | | |
|---|---|---|---|
| 8,418,055 | B2 | 4/2013 | King et al. |
| 2002/0140542 | A1 | 10/2002 | Prokoski et al. |
| 2003/0162591 | A1* | 8/2003 | Nguyen .............. G07F 17/3206 |
| | | | 463/29 |
| 2006/0206709 | A1* | 9/2006 | Labrou .................. G06Q 20/18 |
| | | | 713/167 |
| 2007/0189005 | A1* | 8/2007 | Chapman ................ F21L 4/027 |
| | | | 362/157 |
| 2007/0255953 | A1 | 11/2007 | Peyret |
| 2007/0289005 | A1* | 12/2007 | Kumar .................... H04L 63/08 |
| | | | 726/10 |
| 2008/0111710 | A1* | 5/2008 | Boillot ................. G06V 40/113 |
| | | | 455/566 |
| 2008/0208762 | A1* | 8/2008 | Arthur ................... G06Q 20/20 |
| | | | 705/79 |
| 2009/0156180 | A1* | 6/2009 | Slavin .................. G06Q 20/367 |
| | | | 235/494 |

OTHER PUBLICATIONS

AU2018256469 , "First Examination Report", dated Jan. 7, 2020, 2 pages.
Topkara et al., Digital Watermarking, ViWiD: Visible Watermarking based defense against Phishing; vol. 3710 of the series Lecture Notes in Computer Science, pp. 470-483, Abstract, Book Subtitle: 4th International Workshop, IWDW2005, Sienna, Italy, Sep. 15-17, 2005, Proceedings.
Patent Examination Report No. 1, dated Apr. 8, 2016, in AU Patent Application No. 2015200732, 3 pages.
Examiner's Report, dated Feb. 22, 2018, in AU Patent Application No. 2016277629, 8 pages.

* cited by examiner

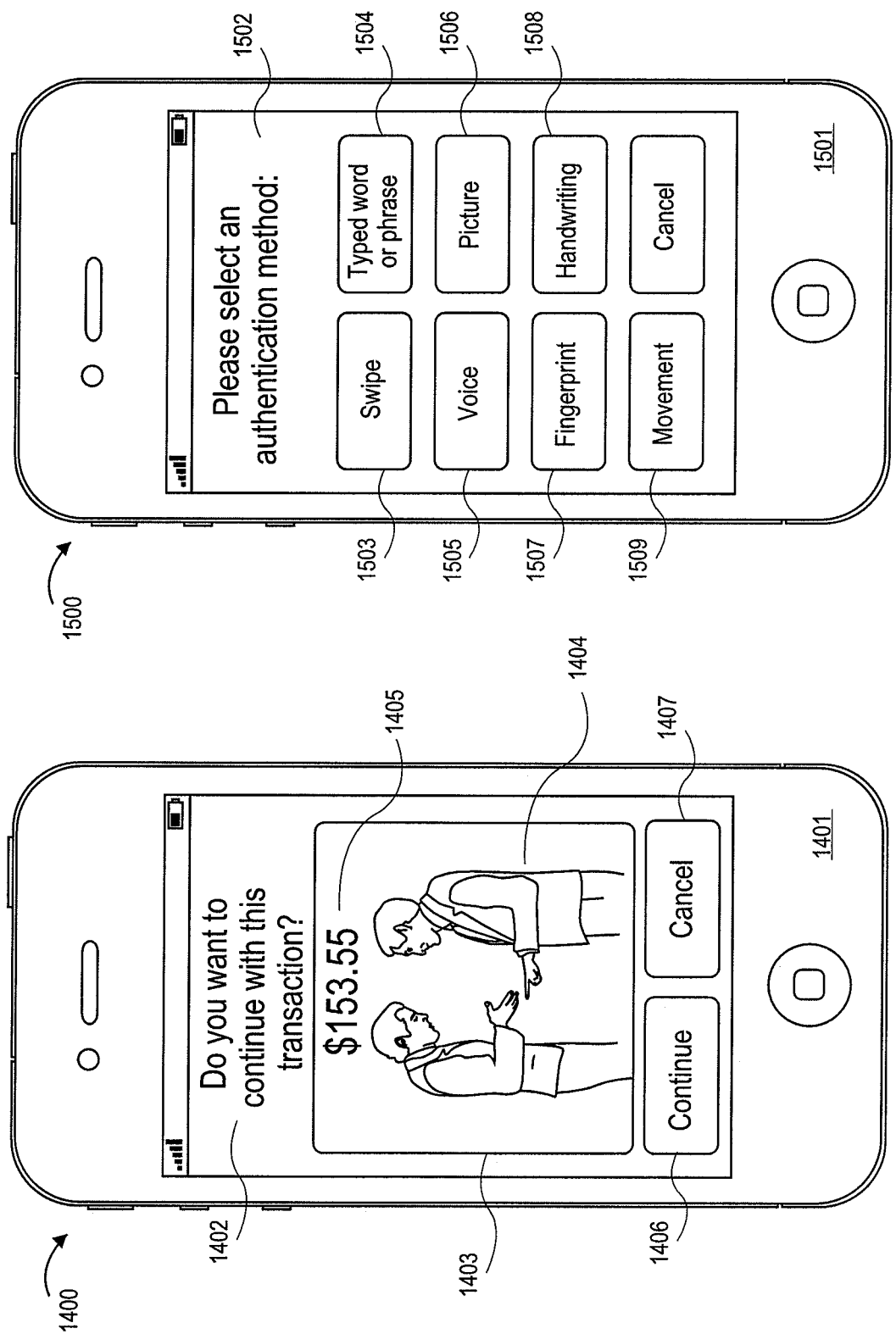

AUTHENTICATION USING APPLICATION AUTHENTICATION ELEMENT

CROSS-REFERENCES TO RELATED APPLICATIONS

This application is a continuation application of U.S. patent application Ser. No. 13/428,431, filed on Mar. 23, 2012, which is a non-provisional of and claims the benefit of U.S. Provisional Application No. 61/467,106, filed Mar. 24, 2011, which are all incorporated by reference in their entirety for all purposes.

BACKGROUND

Mobile communication devices have been gaining in popularity and prevalence in recent years. As mobile communication devices have gained in popularity and familiarity, technology has advanced such that mobile communication devices can now perform many functions that used to be devoted to other systems, including initiating and performing transaction functions. Digital "wallets" or mobile payment applications on mobile communication devices store a user's financial information and allow a user to perform transactions from their mobile communication device. Mobile payment applications are gaining popularity along with mobile communication devices. However, mobile payment applications require the use of sensitive financial and personal information that may be susceptible to theft before, during, and after transactions.

During mobile payment transactions today, a customer chooses, or an issuer or payment processing network provides to the customer, a mobile payment application passcode as a number of digits which is then stored within the mobile payment application. Due to limited capabilities for customers to remember many passcodes, the customer may choose a passcode identical to their automatic teller machine (ATM) personal identification number for their companion credit or debit card. This increases the risk of unauthorized disclosure of the ATM personal identification number. For example, Trojan horses, rogue applications, or other viruses on a portable communication device may sniff a consumer's key strokes during passcode or personal identification number code entry and report the passcode to a third party. As such, important and sensitive passcode and/or personal identification number information pertinent to the security of the consumer's financial accounts may be compromised. Accordingly, there is a need to provide independent passcode generation to separate sensitive information for different payment methods or transactions (e.g. ATM transaction vs. mobile payment application transaction). The use of separate passcodes will ensure that if one passcode is compromised, the other is not.

Another potential security problem that can occur when using a mobile payment system that includes a wireless communication capability is that of protecting the consumer from rogue applications/malware pretending to be the genuine payment application. Rogue applications and malware are designed to trick consumers into giving away their passcode. Mobile communication devices are typically not secure devices and rogue application may easily be installed on the device. Accordingly, there is a need to authenticate an application to a user prior to a user providing sensitive information during a mobile payment transaction using a mobile payment application on a mobile communication device.

Fraudulent transactions are a strain on system resources of payment processing systems as well as the other entities in a mobile payment transaction system. Payment processing networks devote system resources to determining and halting fraudulent transactions before a transaction is completed. Additionally, when a user's sensitive data is stolen by rogue applications or malware and transactions occur using their legitimate account information, the process of determining whether the transaction was fraudulent, who may bear the financial costs of the fraudulent transaction, and the further clearance and settlement required by the system further waste system resources. Accordingly, there is a need to stop fraudulent transactions before a typical transaction is initiated.

Embodiments of the invention address these problems and other problems individually and collectively.

BRIEF SUMMARY

Embodiments of the present invention can be directed to systems, apparatuses, and methods for performing transactions through mobile communication devices using either telecommunications networks and systems or short range communications systems. Mobile communication devices are particularly susceptible to rogue applications or malware. Rogue applications and malware are developed to trick users into providing their account and payment information under false pretenses in order to steal their identity or charge unauthorized transactions using their funds or accounts. As explained in further detail below, embodiments of the present invention use application authentication elements comprising pre-selected authentication tokens and transaction data to authenticate an application to a user prior to the user providing sensitive passcode information to the application. Additionally, embodiments provide user authentication methods to ensure that a user is authorized prior to allowing a transaction to be initiated by the mobile payment application.

Embodiments of the present invention protect users from rogue applications or malware during mobile payment transactions by providing users an application authentication element that may be displayed or played for the user whenever a user is prompted for their mobile payment application user authentication token. During initialization of the mobile payment application operating on the mobile communication device, the user may choose a sound to be played and/or an image, video clip, animation, photo or icon to be displayed whenever they are requested to enter their authentication information in the future. The sound, image, etc. may reassure the user that the application requesting the authentication information is genuine. A rogue application or malware would not know the sound to play or image to display and thus, the sound or image may make it harder to fool the user into unwittingly giving away sensitive information. This increases the security of mobile payment applications and systems.

When performing a mobile payment via a mobile phone using a mobile payment application, the customer (i.e. user) can choose to use, or may be prompted for, a passcode that makes a mobile payment transaction possible. If the correct passcode is not entered, the mobile payment application within the mobile phone may not allow the transaction to proceed. The user may choose a type of repeatable input and a special pattern, which through a compression/calculation of the repeatable input and special pattern, will result in a passcode (which is generally not visible to the outside world) stored within the mobile payment application on the mobile phone. The resulting passcode can be longer and more complex than a traditional ATM personal identification number, so even if it is exposed somehow, it would not be usable at an ATM. Furthermore, every time the customer would normally use the passcode doing a payment transaction, the customer may perform the repeatable input and provide the special pattern which (if correctly done) will allow the mobile payment application to proceed with an actual transaction.

A user can initiate a mobile payment from their mobile phone by launching a mobile payment application. However, transactions generated by mobile phones may be fraudulent because mobile phones are susceptible to theft and transactions typically occur remotely or through proximity communications systems designed for speed and ease of the transaction. Therefore, an identification of the user may not occur even if there is a clerk present. Accordingly, the mobile payment application can require a passcode before allowing any transaction to occur in order to authenticate the user.

However, mobile phones are also highly susceptible to fraudulent or rouge applications that pretend to be a mobile payment application in order to gain financial and personal information about the user. Accordingly, the mobile payment application may have a pre-selected image, photo, sound or video clip, or other data that is stored in a secure location so that whenever the application is asking for sensitive information, especially the passcode for authorizing transactions, the application will play or display the pre-selected image, photo, or other media. When the pre-selected media is displayed or played, the user may recognize it and be reassured that the application is legitimate. The user may be reassured because a rogue or fraudulent application would not have access to the pre-selected media shared between the user and the application during registration. Accordingly, the user can input the sensitive information without worrying about identity or account theft.

However, because the image or sound information may be compromised at some point by a third party, it may be beneficial to include information that is always changing but that is relevant to the transaction in order to ensure that a rogue application has not merely gained access to the pre-selected media. As such, the mobile payment application may request that the application authentication media include not only the pre-selected media but also dynamic or changing data that the user may recognize as relevant to their transaction. As such, the user will be reassured that the application is valid because a fraudulent application would not know the relevant transaction data as well as the pre-selected image. Furthermore, even if the rogue application gains access to the dynamic data, the mobile payment application may generate the application authentication token in a distinct manner that the user will recognize (e.g. always incorporating changing transaction data in a certain portion of an image). Accordingly, after being reassured that the application is valid, the user can enter their passcode and if the passcode is correct, the mobile payment application may allow a transaction to occur.

Furthermore, embodiments of the present invention provide users many different types of user authentication passcodes, using a wide range of input methods that typical transaction devices (point-of-sale device, ATM machine, etc.) do not allow. Accordingly, embodiments of the present invention minimize the risk that a user will use their ATM personal identification number or other sensitive information on the payment application. Therefore, the risk that a rogue application would intercept a user's sensitive information even if they gain access to the payment application passcode is minimized.

Additionally, when the user enters their user authentication token, a secret token is created that may not correspond to any typical ATM personal identification number or other passcode information. Therefore, even if the user sets the same passcode as their ATM personal identification number and the secret token is intercepted or obtained by a rogue application, the secret token obtained by the rogue application may not match the user's ATM personal identification number. For example, if the user enters their ATM personal identification number of 1, 2, 3, 4 as their user authentication token, a typical ATM transaction would set the passcode equal to 1234. However, the mobile payment application may use pattern recognition hardware or software to create a secret token from the user authentication token input by the user. As such, entering a user authentication token of 1234 may result in a secret token of any length output by the pattern recognition component. For example, if the pattern user authentication token matches the pattern of 1234 set by the user during an initialization phase, the secret token will not be set to 1234 but instead could be set to any data string. For instance, the secret token could be a 1111 instead. Additionally, the passcode could be inverted or otherwise manipulated when creating the secret token based on the user authentication token. For example, the personal identification number pattern that is input as a user authentication token could be inverted to create a secret token of 4321. Accordingly, the secret token may be longer and more convoluted than the original personal identification number, even though the consumer is only entering their personal identification number.

Some embodiments are directed to a method of performing a transaction. The method may involve a mobile communication device providing an application authentication element that may include a pre-selected authentication element. Providing may include displaying or playing. The application authentication element may also include transaction data associated with a transaction conducted by the mobile communication device. The mobile communication device may obtain the pre-selected authentication element by either transmitting a request to a server computer or retrieving the pre-selected authentication element from a secure memory in the mobile communication device. A user authentication token may then be received by the mobile communication device from the user. The mobile communication device may then generate a secret token that is derived from the user authentication token. Then, a transaction may be conducted using an application on the mobile communication device.

Some embodiments are directed to a mobile communication device. The mobile communication device may include an antenna; a processor; and a non-transitory computer-readable storage medium coupled to the processor where the non-transitory computer-readable storage medium includes code executable by the processor for implementing a method of performing a transaction. The method of performing the transaction may involve a mobile communication device providing an application authentication element. The application authentication element may include a pre-selected authentication element. Providing may include displaying or playing. The application authentication element may also include transaction data associated with a transaction conducted by the mobile communication device. The mobile communication device may obtain the pre-selected authentication element by either transmitting a request to a server computer or retrieving the pre-selected authentication element from a secure memory in the mobile communication device. A user authentication token may then be received by the mobile communication device from the user. The mobile communication device may then generate a secret token that is derived from the user authentication token. Then, a transaction may be conducted using an application on the mobile communication device.

Some embodiments are directed to a method of performing a transaction involving a processor receiving an application authentication request. The processor may then generate an application authentication element including a pre-selected authentication element. The application authentication element may also include transaction data associated with a transaction conducted by the mobile communication device. The processor may then provide the application authentication element to a mobile communication device. The application authentication request may be an application authentication request message from the mobile communication device. Providing the application authentication element to the mobile communication device may include sending an application authentication response message comprising the application authentication element to the mobile communication device. The processor may also receive a secret token that is generated by the mobile communication device using a user authentication token. The processor may retrieve a secret reference token that is associated with the user or the mobile communication device. The processor may then compare the secret token to a secret reference token. If the secret token and the secret reference token are correlated, the processor may send a user authentication message to the mobile communication device. However, if the secret token and the secret reference token are not correlated, the processor may send a denial message to the mobile communication device.

Some embodiments are directed to an apparatus. The apparatus may include a processor and a non-transitory computer-readable storage medium coupled to the processor, the computer-readable storage medium comprising code executable by the processor for implementing a method of performing a transaction. The method may include receiving an application authentication request. The method may then generate an application authentication element including a pre-selected authentication element. The application authentication element may also include transaction data associated with a transaction conducted by a mobile communication device. The method may further comprise providing the application authentication element to the mobile communication device. The apparatus may receive a secret token that is generated by the mobile communication device using a user authentication token. The apparatus may retrieve a secret reference token that is associated with the user or the mobile communication device. The apparatus may then compare the secret token to a secret reference token. If the secret token and the secret reference token are correlated, the apparatus may send a user authentication message to the mobile communication device. However, if the secret token and the secret reference token are not correlated, the apparatus may send a denial message to the mobile communication device.

These and other embodiments of the invention are described in further detail below.

BRIEF DESCRIPTION OF THE DRAWINGS

FIG. 14 shows an exemplary user interface of a mobile payment application during a transaction showing an application authentication element on a mobile communication device according to one embodiment of the invention.

FIG. 15 shows an exemplary user interface of a mobile payment application prompting a user to enter a type of user authentication displayed on a mobile communication device according to one embodiment of the invention.

DETAILED DESCRIPTION

Figure 1:
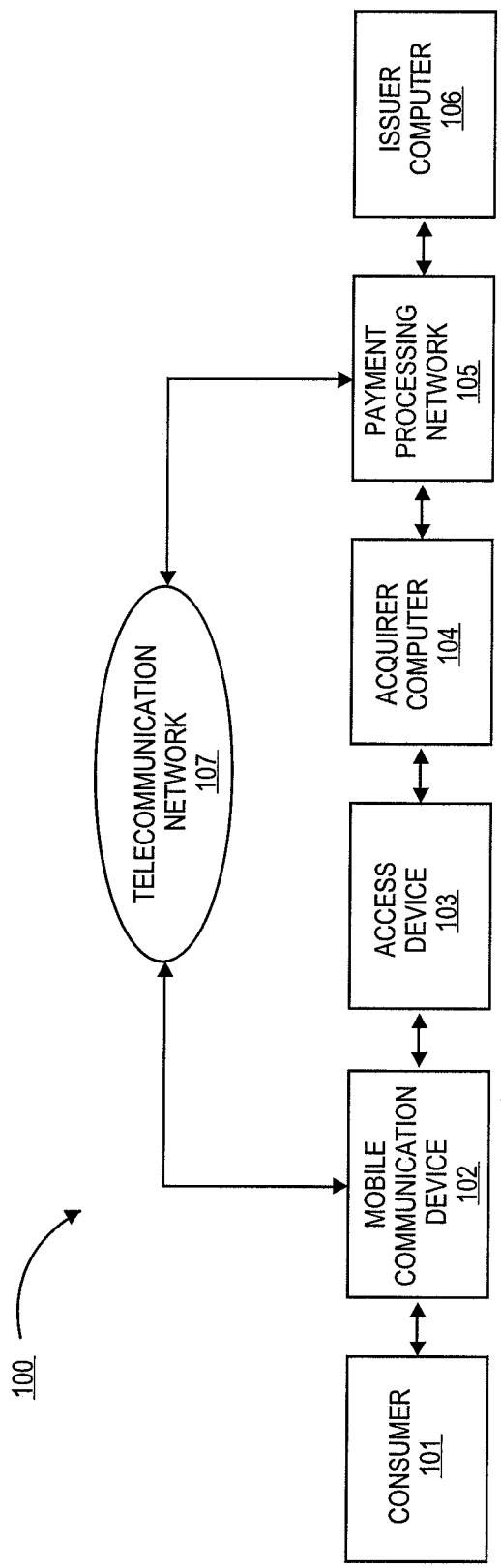
FIG. 1 shows a block diagram illustrating a transaction processing system that may be used with some embodiments of the present invention.

Embodiments of the invention relate to methods and systems for authentication through application authentication element as well as methods and system for mobile payment transactions through mobile communication devices. Particularly, embodiments of the invention relate to providing protection from malicious, fraudulent, or rogue applications that are designed to steal consumer sensitive information including financial and personal information.

However, prior to discussing the example embodiments of the invention, a further description of some terms can be provided for a better understanding of embodiments of the invention.

As used herein, a "mobile communication device" can refer to any portable device that has the capability to communicate through a telecommunications network. These devices may be operated by a user and may include any functionality in conjunction with communications capabilities. For example, the mobile communication device may be a mobile phone, a tablet computer, a smart phone, a netbook, or any other mobile device with the capability to connect to a communications network. Additionally, the mobile communication device may comprise one or more input interfaces including a touchscreen, keyboard, camera, microphone, accelerometer, compass, fingerprint or other biometric measurement device, barcode or other laser reading device, input ports for other input devices, etc. to allow a user controlling the device to input information. The mobile communication device may receive a user authentication token from a user using one or more of these input interfaces and/or components. Additionally, the mobile communication device may comprise a display and/or other output components including speakers, projector, output ports, etc. that allow the device to output information to a user. The mobile communication device may display or play an application authentication element to a user using these output interfaces and/or components. Finally, the mobile communication device may also have the ability to generate a secret token that is derived from a user authentication token as described in further detail below.

As used herein, an "application authentication element" can refer to any data element that validates the authenticity of an application to a user. The application authentication element may be a graphic, sound clip, video clip, animation, or any other media or non-media element that may be transmitted and displayed or played to a user through a mobile communication device. The application authentication element may be generated by an application authentication element generation module on a server computer or on a mobile communication device having access to a secure memory. As one of ordinary skill in the art would recognize, the application authentication element generation module may be implemented in any suitable manner on the server computer or mobile communication device.

The application authentication element may comprise a pre-selected authentication element and transaction data associated with a transaction conducted by the mobile communication device. Furthermore, the application authentication element may be a combination of any two or more separate data elements that are known by the user prior to generation of the application authentication element. A data element can be any data that makes up a recognizable piece of information for a user. For instance, a picture can be a data element. Furthermore, a song, a alphanumeric sentence, word, or a sound may be a data element. Additionally, the application authentication element can be made up of portions of one or more data elements that are known or unknown by the user. For example, the application authentication element may be made up of portions of one data element that is well known and another data element that is reasonable given the context of the situation or unknown but within a particular group or type of information. For instance, the application authentication element may be made up of a picture selected by a user with a picture of an animal embedded into the selected picture. The user may not have known which picture of an animal was embedded but by recognizing the subject matter of the picture, the user can verify that the application is not fraudulent or malware.

As such, the application authentication element validates the authenticity of an application to a user by providing agreed upon modifications to a single data element or by combining multiple data elements in a pre-determined or pre-arranged manner that is recognizable by a user. The application authentication element is preferably made up of elements that would not be easily discernable by a fraudulent or rogue application. For example, using data that is dynamic would be preferable to data that is static when generating the application authentication element because static information could be intercepted by a rogue application and used to trick users during future transactions. For example, a system may use transaction data that is constantly changing for every transaction as well as a pre-selected authentication element to inform the user that the application is authentic. One of ordinary skill in the art may recognize other combinations of such data in order to authenticate that an application is valid.

As used herein, an "application authentication request message" can refer to any message or series of messages sent from a mobile communication device or access device requesting an application authentication element from a secure server or secure memory within a contactless element. The message may comprise any appropriate information in order to request an application authentication element including user registration information, device registration information, past transaction history, or any other pertinent information to generating and returning an application authentication element to the requestor. Furthermore, the application authentication request message may comprise information that is unrelated to the generation of an application authentication element as well.

As used herein, an "application authentication response message" can refer to any message or series of messages sent from a server computer or secured chip device responding to a mobile communication device or access device in order to authenticate an application. Although the application authentication response message may be sent in response to an application authentication request message, the application authentication response message is not limited to only those situations where a request is received. For example, it may be that an application authentication response message is automatically sent to a mobile communication device when any transaction data is received. The application authentication response message may comprise any appropriate information in order to respond to an application authentication request message with an application authentication element. Furthermore, the application authentication request message may comprise information that is unrelated to the generation and transmission of an application authentication element as well.

As used herein, a "pre-selected authentication element" can refer to any media or non-media data element that is recognizable, known, or selected, in part or in its entirety, by a user during an initialization or registration phase for an application. As explained above, the pre-selected authentication element, or a portion of the pre-selected authentication element, may be part of the application authentication element. The pre-selected authentication element may be a data element that is reproducible, able to be transmitted, and displayed or played to a user through a mobile communication device. For example, the pre-selected authentication element may comprise a picture, a graphic, a collection of words, letters, or numbers, an animation, a sound clip, a video clip, or any other media input that may be recognizable, reproducible, and modifiable. The pre-selected authentication element may be encrypted in order to protect it in the case of interception or discovery by unauthorized users. Additionally, the pre-selected authentication element may be stored on a secured memory in a mobile communication device or may be stored in a secured database coupled to a server computer that can communicate with a mobile communication device directly or indirectly.

As used herein, a "type of pre-selected authentication element" can refer to the type of pre-selected authentication element input chosen by the user or pre-selected for the user. For example, a user may be provided with a choice as to the type of pre-selected authentication element they can choose. Potential types of pre-selected authentication elements may include a picture or graphic, a collection of words, letters, and numbers, an animation, sound clip, or video clip, or any other media input that may be recognizable, reproducible, and modifiable. The user may or may not be given a choice as to the type of pre-selected authentication element before they may choose the pre-selected authentication element. Additionally, the pre-selected authentication element may be provided to the user without the user having a choice as to the pre-selected authentication element. The type of pre-selected authentication element may directly affect the type of application authentication element that is generated as the pre-selected authentication element is used to generate the application authentication element.

As used herein, "transaction data" can refer to any data connected or associated with a transaction that may be conducted by a mobile communication device. For example, transaction data may include a transaction date, transaction time, transaction amount, account number, CVV code if using a credit or debit card account, expiration date, consumer address, zip code, or phone number, merchant address, zip code, or telephone number, transaction amount, or any other data associated with a transaction. As explained above, transaction data may be part of an application authentication element. Additionally, transaction data may be a portion of a transaction record or the entire transaction record. Finally, the transaction data may be a combination of different portions of a transaction record. For example, transaction data could comprise the street name from a consumer that is involved in a transaction as well as the transaction amount of the transaction.

As used herein, a "transaction" can refer to any interaction between one or more parties capable of communicating transaction details. Specifically, the transaction may be conducted by a mobile communication device. These parties may include persons, businesses, corporations, organizations, or any other entities capable of performing obligations and agreements. The transaction may include an exchange of monetary value or merely the exchange of obligations or information. The transaction may occur through any suitable manner as described below and recognized by one of ordinary skill in the art. The transaction may occur in person, meaning both parties or party representatives are interacting in the same physical location, or the transaction may occur between parties that are remote from one another. Additionally, a transaction may be unilateral, meaning only one party is initiating or participating in the transaction, or bilateral, meaning there are two active parties. For example, in one embodiment, a single user can initiate a payment to a party that is not aware of the payment until the transaction has occurred. Such a case would involve an online bank account transfer to another party who is unaware of the transaction before the payment appears in their account.

As used herein, a "type of user authentication" can refer to any capable repeatable data input allowable by a mobile communication device. For example, a mobile phone with a touchscreen could allow a user to input information through touching the screen with a finger or stylus. Other possible types of user authentication inputs could be voice input through the phone's microphone, characters or numbers input through the mobile device's digital or analog keyboard, pictures or images input through a phone's camera, biometric information input through specialized data inputs on the mobile device, movements, positions, or accelerometer data input through the use of an accelerometer or internal compass in a mobile communication device, or any other information that can be captured by a mobile communication device through interaction with a user.

As used herein, a "user authentication token" can refer to any repeatable input from a user to a mobile communication device using a type of user authentication. Some possible user authentication tokens may include a "swipe" where a user swipes a particular pattern on the mobile communication device's touchscreen using their finger, a signature using a finger or stylus on the touchscreen, a spoken statement or song, a drawing using the device's touchscreen, a picture of a familiar item, biometric data (e.g. picture of the user's iris, fingerprint, etc.) or any other repeatable input using one of the type of user authentication inputs described above.

As used herein, a "secret token" can refer to any type of data that may be derived from a user authentication token and may be generated by a mobile communication device. Furthermore, the secret token may be sent by a mobile communication device and may be received by any system component but typically by a server computer or a secure data chip. In order to remain a secret, the secret token may be encrypted or otherwise protected from access by unintended parties. Additionally, the secret token may be stored in a secured memory or database for future use. Furthermore, the generation of the secret token is not apparent to the user or is unknown by the user. Moreover, even if the generation of the secret token may be known by the user, the user may not gain access to the secret token nor know what the secret token is. For example, if the user inputs their user authentication token through a swipe on a touchscreen, the touchscreen may have a different numerical value for each area of the screen that is touched using Cartesian coordinates. The Cartesian coordinates of the swipe vertices may be saved and a radial buffer about the coordinates may be set to allow less exacting gesture pointing to be sufficient for swipe pattern acceptance. For example, the screen could be divided into 25 different value sections, numbered 01-25. If the user's swipe touches sections 01, 04, 07, 10, and 12 then the secret token could be 0104071012. The secret token may be directly or indirectly derived from the swipe values. For example, the secret token could be further manipulated such that the inverse of the touched sections may be used resulting in a secret token of 2522191513. In either case, the secret token will be derived from the user authentication token and the value will not be displayed to the user.

The secret token may change in format or appearance depending on the type of user authentication selected by the user. For example, using the example above of a user swipe, the input may be binary or alphanumeric digits representing the sections touched by a user's swipe. However, in the case of a position or movement type of user authentication token, the secret token may correspond to digital values received from the accelerometer or internal compass of the mobile communication device. This data may be completely different from a secret token generated using a swipe including the length of the data pattern, the value range, etc. However, in whatever manner that the secret token is created, the user may not be aware or provided access to the secret token.

As used herein, a "secret reference token" can refer to any type of data that is derived from the user authentication token during the initialization or registration phase of the mobile payment application. As such, the secret reference token may be the same as a secret token but captured during the initialization or registration phase of the mobile payment application. The secret reference token may be stored in a secure memory on the mobile communication device or may be stored in a remote database coupled to a server that may be connected to the mobile communication device through a communications network. The secret reference token would be saved in a database or secure memory of the mobile communication device and used to compare to a secret token derived from a user authentication token entered during a transaction or prior to allowing the mobile payment application to undertake a typical transaction processing.

As used herein, "comparing" can refer to any method of examining two pieces of information to determine their degree of similarity. Comparing may include software or hardware components or algorithms that can compare data strings bit by bit or compare recognized patterns and similarities in data patterns to determine correlation between data. On a server computer, a token comparison module may perform the comparison function and a similar function may be implemented using a processor within a contactless element or chip. Furthermore, comparing could include patterns that are recognized by a computer through artificial intelligence or any other means that would be recognized by one of ordinary skill in the art.

A correlation factor or risk factor may be provided in order to determine whether the pieces of information are correlated enough to be considered "correlated" even if there are small differences due to user error or system noise, environmental conditions, etc. A secret token and a secret reference token may be compared to determine whether the secret tokens are correlated. Determining whether the secret tokens are correlated may include comparing each bit of the secret tokens to determine the differences or may include comparing patterns within the secret tokens for known error depending on the type of user authentication being used. For instance, using the example above, lets assume that the secret reference token is 0104071012. If the user is attempting to authenticate a transaction while using the mobile communication device in the rain, the screen may not function exactly as it would in dry conditions and a section or two may be read incorrectly or the user's finger may slip. For example, the swipe may contact sections 01, 03, 06, 10, and 12 instead of 01, 04, 07, 10, and 12 resulting in a secret token of 0103061012. The token comparison module at the server computer could determine that these data strings are close enough to determine the secret tokens are correlated based on known patterns resulting from environmental conditions or the token comparison module could find that the correlation factor or risk factor is too high (or low) and find that the secret tokens are not correlated. Additionally, any other method as would be recognized by one or ordinary skill in the art may be used to compare the information.

Generally, embodiments relate to apparatuses, systems, and methods of performing mobile transactions. In particular, some embodiments may provide application authentication capabilities to a user in order to reassure the user that the application requesting sensitive information is legitimate. Additionally, some embodiments may include user authentication capabilities that provide unique secret tokens that may not correspond to other transaction system passcodes.

I. Exemplary Transaction Processing System

FIG. 1 is a block diagram illustrating a transaction processing system that may be used with some embodiments of the present invention. Typically, a transaction processing system is directed to authorizing electronic payment transactions. An electronic payment transaction is authorized if the consumer conducting the transaction is properly authenticated (i.e., their identity and their valid use of a payment account is verified) and if the consumer has sufficient funds or credit to conduct the transaction. Conversely, if there are insufficient funds or credit in the consumer's account, or if the consumer's payment device is on a negative list (e.g., it is indicated as possibly having been stolen or used in a fraudulent manner), then an electronic payment transaction may not be authorized. In the following description, an "Acquirer computer" is typically a computer located at a business entity (e.g., a commercial bank) that has a business relationship with a particular merchant. An "Issuer computer" is typically a computer at a business entity (e.g., a bank) which issues a payment device (such as a credit or debit card) to a consumer. Some entities may perform both issuer computer and acquirer computer functions and those entities would have a computer that could implement both functions.

FIG. 1 illustrates the primary functional elements that are typically involved in processing a mobile payment transaction using a mobile payment application operating on a mobile communication device and in the authorization process for such a transaction. As shown in FIG. 1, in a typical mobile payment transaction using a mobile communication device 102, a consumer 101 (i.e. user) wishing to purchase a good or service from a merchant uses a mobile communication device 102 to provide mobile payment transaction data that may be used as part of an application authentication, consumer verification, or transaction authorization process. Mobile communication device 102 may be a mobile device containing a contactless chip, components or systems for connecting to any communication networks or other suitable forms of devices. For example, the mobile communication device could be a mobile phone, a tablet computer, a smart phone, a netbook, or any other mobile device with the capability to connect to a communications network.

The mobile communication device 102 may be brought within proximity to an access device 103 which may be a device reader or point of sale (POS) terminal which is able to access data stored within the mobile communication device 102. The access device 103 may be operated by a merchant or any other entity that facilitates transactions such as a bank, credit union, or any other service provider. The account data (as well as any required consumer data) is communicated to the access device 103. The access device 103 typically communicates with an acquirer computer 104 (which manages the merchant or access device operator's accounts) as part of the overall authentication or authorization process. Access device 103 and/or acquirer computer 104 provide data to a payment processing network 105, which among other functions, participates in the clearance and settlement processes that are part of the overall transaction processing. Communication and data transfer between the access device 103 and payment processing network 105 is typically by means of an intermediary, such as acquirer computer 104. As part of the consumer verification or transaction authorization process, payment processing network 105 may access numerous account databases which typically contains information regarding the consumer's account payment history, chargeback or transaction dispute history, credit worthiness, etc. Payment processing network 105 communicates with an issuer computer 106 as part of the authentication or authorization process, where the issuer computer 106 is the entity that issued the payment account that is being used by the mobile payment application to the consumer (as well as the corresponding credit or debit card if there is one) and manages the consumer's account. Customer or consumer account data is typically stored in customer/consumer database coupled to the issuer computer 106 which may be accessed by the issuer computer 106 as part of the authentication, authorization or account management processes.

In standard operation, an authorization request message is created during a consumer purchase of a good or service at a point of sale (POS) using a mobile communication device 102. In some embodiments, the mobile communication device 102 may be a wireless phone or personal digital assistant that incorporates a contactless card or chip. The contactless card or chip may communicate with the point of sale terminal using a near field communications (NFC) capability. The authorization request message is typically sent from the access device 103 including a device reader/POS terminal, to the merchant's associated acquirer computer 104, to a payment processing network 105, and then to an Issuer computer 106. An "authorization request message" can include a request for authorization to conduct an electronic payment transaction and data relevant to determining if the request may be granted. For example, the message may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the issuer computer 106 receives the authorization request message, the issuer computer 106 determines if the transaction may be authorized and sends an authorization response message back to the payment processing network 105 to indicate whether or not the current transaction is authorized. The payment processing network 105 then forwards the authorization response message to the acquirer computer 104. The acquirer computer 104 then sends the response message to the Merchant access device 103 and to the mobile communication device 102 via the access device 103. The Merchant is thus made aware of whether the Issuer computer 106 has authorized the transaction, and hence whether the transaction can be completed.

At a later time, a clearance and settlement process may be conducted by elements of the payment/transaction processing system depicted in FIG. 1. A clearance process involves exchanging financial details between an acquirer computer 104 and an issuer computer 106 to facilitate posting a transaction to a consumer's account and reconciling the consumer's settlement position. Clearance and settlement can occur simultaneously or as separate processes.

Payment processing network 105 may include data processing subsystems, networks, and other means of implementing operations used to support and deliver authorization services, exception file services, and clearing and settlement services for payment transactions. An exemplary Payment processing network 105 may include VisaNet. Payment processing networks 105 such as VisaNet are able to process credit card transactions, debit card transactions, and other types of commercial transactions. VisaNet, in particular, includes a VIP system (Visa Integrated Payments system) which processes transaction authorization requests and a Base II system which performs transaction clearing and settlement services.

Payment processing network 105 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 105 may use any suitable combination of wired or wireless networks, including the Internet, to permit communication and data transfer between network elements. Among other functions, Payment processing network 105 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

Figure 2:
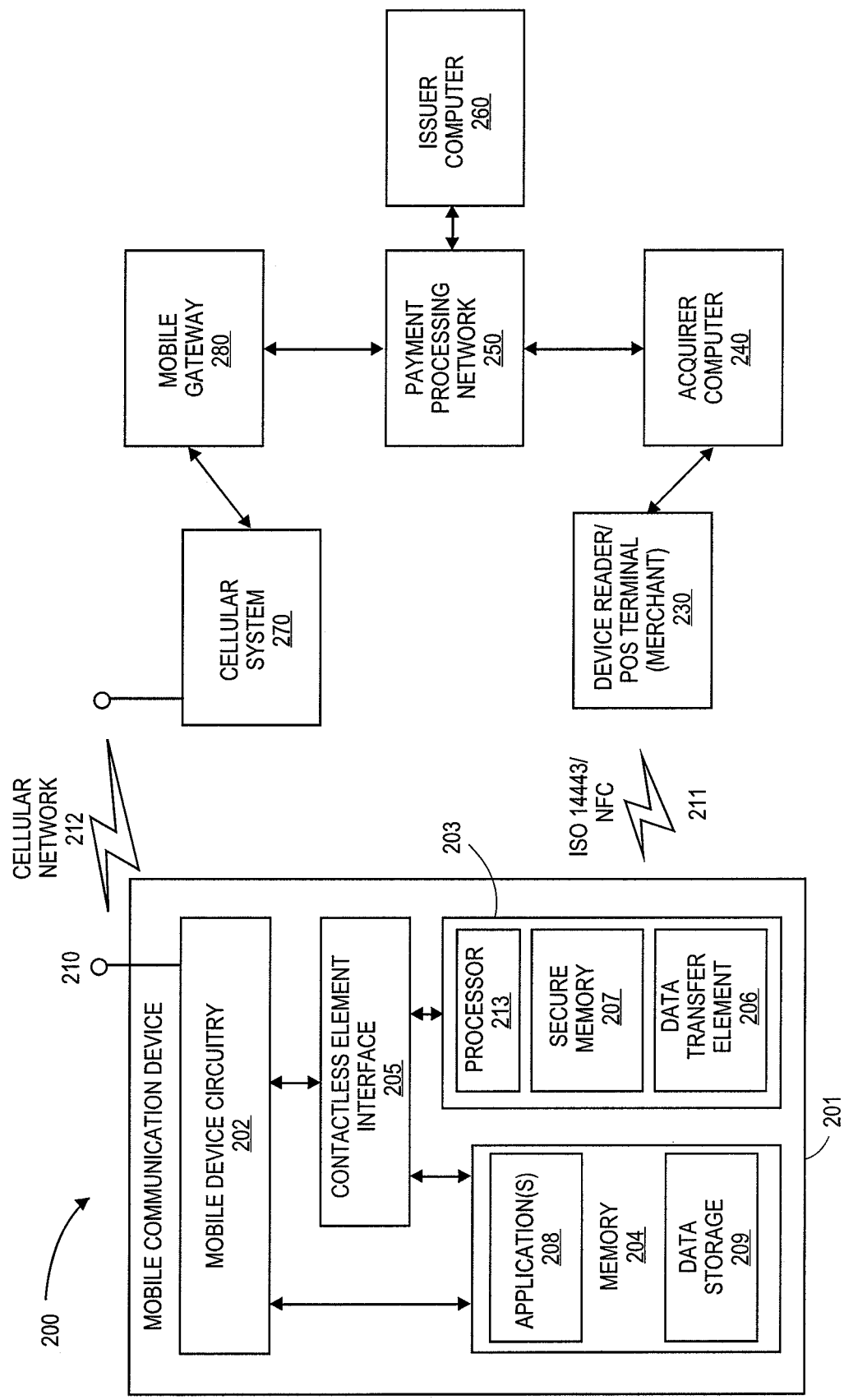
FIG. 2 shows a block diagram illustrating a transaction processing system that may be used with some embodiments of the present invention showing functional aspects of the mobile communication device and telecommunications network.

FIG. 2 shows a block diagram illustrating a transaction processing system 200 that may be used with some embodiments of the present invention showing functional aspects of the mobile communication device 201 and telecommunications network 107 (in this case a cellular network 212). Mobile communication device 201 may be a mobile device that incorporates a contactless element 203 such as a chip for storing payment data (e.g., a BIN number, account number, etc.) and includes a processor 213, a secure memory 207, and a near field communications (NFC) data transfer element 206 such as an antenna, a light emitting diode, a laser, etc. The mobile device containing the contactless card or chip, or other data storage element may be a cellular (mobile) phone, personal digital assistant (PDA), pager, transponder, or the like.

The cellular network 212, may also include any components or systems necessary to communicate with a payment processing network 250. For example, a mobile gateway 280, which is capable of coupling the cellular (wireless) network or system 270 to a second network (typically a wireline network such as the Internet) and enabling the transfer of data between the networks, could be implemented. The mobile gateway 280 may perform data processing operations as needed to permit the efficient transfer of data between the two types of networks, including, but not limited to, data reformatting or other processing to take into account differences in network protocols. The mobile gateway 280 may also perform data processing operations to enable more efficient data transfer between the networks and devices coupled to each type of network, such as for purposes of improving the ability of a consumer to utilize the received data on a mobile communication device. The mobile gateway 280 may be coupled to the payment processing network 250, which is coupled to an acquirer computer 240. However, the mobile gateway 280 or other connection components may be implemented in any manner that one of ordinary skill in the art would recognize, such as where a mobile gateway 280 is coupled to an issuer computer 260, as well as where acquirer computer 240 is coupled to issuer computer 260. Similarly, issuer computer 260 may include the capability of functioning as a mobile gateway 280.

Mobile communication device 201 further includes a contactless element 203, typically implemented in the form of a semiconductor chip. Contactless element 203 may include a processor 213 and a secure memory element 207, although the secure memory element 207 and the processor 213 may also be implemented as a separate element from contactless element 203. Contactless element 203 includes a near field communications (NFC) data transfer (e.g., data transmission) element 206, such as an antenna or transducer. The near field communications capability permits a device reader or point of sale terminal 230 to exchange data with (or perform operations on) contactless element 203 as part of, or in preparation for, a payment transaction. In some embodiments, contactless element 203 may be embedded within and integrated with the elements of mobile communication device 201. In such a case, data or control instructions may optionally be transmitted via cellular network 212 and be exchanged with, or applied to, contactless element 203 by means of contactless element interface 205. In that situation, contactless element interface 205 functions to permit the exchange of data and/or control instructions between mobile communication device circuitry 202 (and hence the cellular network) and contactless element 203. Thus, contactless element 203 may include data storage capability in the form of a memory or secure memory 207 that may be accessed via a near field communications capability or interface 205 to permit the implementation of data read, write, and erase functions, for example. Additionally, the contactless element 203 may include a processor 213 that may perform any of the above functions as well as any additional functions performed by the contactless element 203 during a transaction using the contactless element. Additionally, due to the secure memory 207 located on the contactless element 203, the processor 213 of the contactless element 203 may perform any processing that requires access or use of the secure memory 207.

In embodiments of the invention that include a contactless element 203 (e.g., a contactless chip and near field communications data transfer element) embedded within a wireless mobile phone or similar device, the contactless element can communicate with an access device 103 including a Merchant's device reader or point of sale terminal 230 using a short range communication method, such as a near field communications (NFC) capability 211. Examples of such NFC technologies or similar short range communications technologies include ISO standard 14443, RFID, Bluetooth™ and Infra-red communications methods.

Secure memory 207 may be used by mobile communication device 201 to store operating parameters or other data utilized in the operation of the device. Secure memory 207 may also be used to store other data for which enhanced security is desired, for example, transaction data, personal account data, identification data, authentication data, access control data for an application or device function, etc. As mentioned, secure memory 207 may be implemented in the form of a chip that is separate and apart from contactless element 203, or alternatively, may be a section of memory in a chip that forms part of contactless element 203. Additionally, a processor 213 may be included as part of the contactless element 203 or may be separate within the mobile communication device 201. The processor 213 may access the secure memory 207 and the data transfer element 206 in order to perform transactions using the contactless element 203 or transactions and processes requiring access to the secure memory 207. Note also that the secure memory 207 and/or contactless element 203 contained within the mobile communication device may be a removable element or may be integrated within the mobile communication device. Examples of removable elements include SIM cards, flash memory cards, and other suitable devices.

Mobile communication device 200 may also include one or more applications 208, where applications 208 are implemented in the form of one or more of software, firmware, or hardware. Applications 208 are used to implement various functions desired by a consumer, where such functions may include, but are not limited to, eCommerce transaction operations, payment transaction operations, etc. Typically, applications 208 represent processes or operations that are dedicated to a specific function that provides added value for the consumer and which are not part of the standard operation of the device (i.e., not part of enabling the standard telephony functions, for example). As shown in the figure, applications 208 may exchange data with secure memory 207 (via contactless element interface 205) and may also be capable of exchanging data with mobile communication device circuitry 202. Additionally, applications may be executed by the processor 213 located on the contactless element 203 or a separate processor as part of the mobile device circuitry 202. A typical application 208 for the purposes of the present invention is a mobile payment application that enables a consumer to make a payment for a transaction, where the transaction is wholly or partially conducted using the mobile communication device 201. In such an example, secure memory 207 may contain authentication data, consumer identification data, transaction record data, account balance data, etc. Applications 208 are typically stored as a set of executable instructions in memory 204, which may also include data storage 209. A processor 213 accesses memory 204 to load and unload the instructions and data as needed to execute the instructions to perform the functions of the applications. Note that for purposes of the present invention, a payment application may be contained in a data storage region 209 of the mobile communication device that is part of, or separate from, the secure memory 207 contained in the contactless element 203. Additionally, as explained above, the processor 213 accessing the memory in order to execute the mobile payment application may also be located on the contactless element 203.

Contactless element 203 is capable of transferring and receiving data using data transfer element 206 which implements a near field communications capability 211, typically in accordance with a standardized protocol or data transfer mechanism (identified as ISO 14443/NFC in the figure). Near field communications capability 211 is a short-range communications capability; examples include ISO 14443, RFID, Bluetooth™, infra-red, or other data transfer capability that can be used to exchange data between the mobile communication device 201 and a device reader or point of sale terminal 230, which is typically located at a Merchant's place of business. Thus, in some embodiments, mobile communication device 201 is capable of communicating and transferring data and/or control instructions via both cellular network 212 and near field communications capability 211, although communications and data transfer by means of the cellular network is not required in order to implement some embodiments of the present invention.

Figure 3:
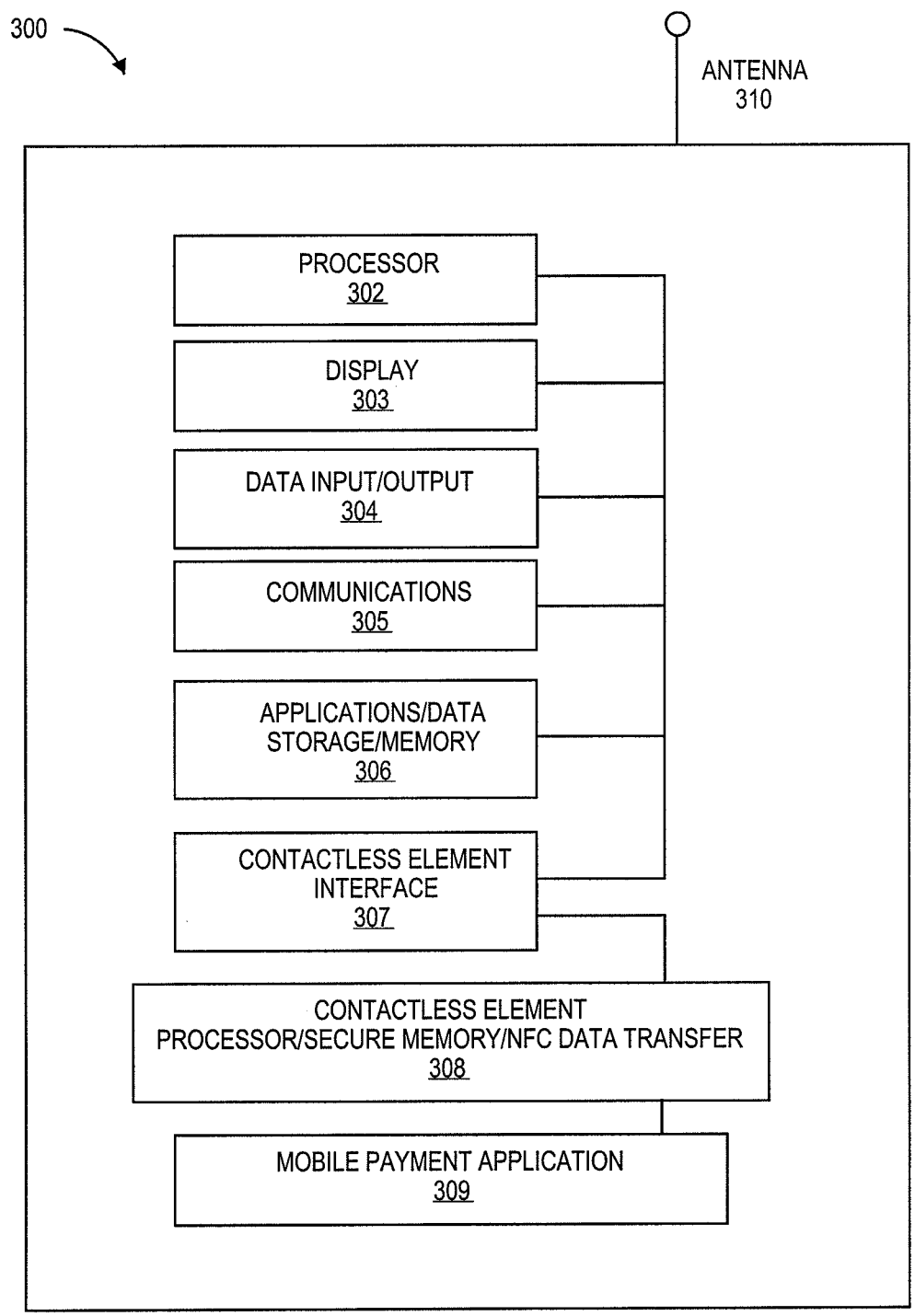
FIG. 3 shows a block diagram of a mobile communication device according to one embodiment of the invention.

One example of a mobile communication device 201 that may be used to implement embodiments of the present invention is a mobile wireless phone equipped with a NFC capability. FIG. 3 is a functional block diagram illustrating the primary components of a portable consumer device (e.g., element 102 of FIG. 2), such as a mobile phone that may be used as part of the inventive system and methods. The elements in the functional diagram of FIG. 3 may correspond directly to the components in the mobile communication device 201 shown in FIG. 2. For example, the processor 302, display 303, data input/output 304, and communications 305 may be implemented as part of the mobile device circuitry 202 of FIG. 2. Additionally, the applications, data storage, and memory 306 of FIG. 3 may correspond to the memory 204 including applications 208 and data storage 209 in FIG. 2. Furthermore, the contactless element interace 308 of FIG. 3 corresponds directly to the contactless element interface 205 of FIG. 2. Finally, the contactless element comprising a processor, secure memory, and NFC data transfer 308 in FIG. 3 may correspond directly to the contactless element 203 including a processor 213, secure memory 207, and data transfer element 206 in FIG. 2.

As illustrated in FIG. 3, mobile communication device 300 may include circuitry that is used to enable certain telephony and other device functions. The functional elements responsible for enabling those functions may include a processor 302 for executing instructions that implement the functions and operations of the device. Processor 302 may access data storage 306 (or another suitable memory region or element including the secure memory located on the contactless element) to retrieve instructions or data used in executing the instructions.

Data input/output elements 304 may be used to enable a user to input data (via a microphone, keyboard, touchscreen, fingerprint detector, biometric data input device, for example) or receive output data (via a display screen 303 or speaker, for example). As will be described, in some embodiments of the present invention, one or more of the data input elements (or a controller for the data input element) may function as a "type of user authentication" that provides a "secret token" to a payment application in response to entry of a user authentication token by a user. The secret token is then used by the payment application to authenticate the user and enable access to the functions of the payment application. Communications element 307 may be used to enable data transfer between mobile communication device 300 and a wireless network (via antenna 310, for example) to assist in enabling telephony and data transfer functions. The mobile communication device 300 may also include contactless element interface 307 to enable data transfer between contactless element 308 and other elements of the device, where contactless element 308 may include a secure memory and a near field communications data transfer element. The contactless element may further include a mobile payment application 309 (shown) executed by a processor within the contactless element 308. However, as described above, the mobile payment application may also be implemented using a processor accessing the application, data storage, and memory 306 (not shown). The contactless element 308 may implement a near field communications capability that enables communication and data transfer between mobile communication device 300 and an access device 103 including a device reader or POS terminal that is part of a payment transaction processing system 105.

Data storage 306 may be a memory that stores data, and may be in any suitable form including a memory chip, disk drive, flash memory, etc. The memory may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may instead, or also be stored in a secure memory element, such as secure memory 207 or a similar secure memory that is part of contactless element 308. As described, data storage 306 may also contain instructions which when executed by processor 302 implement operations or processes that are part of the operation of the device or of applications installed on the device.

Data storage 306 or a secure memory element that is part of contactless element 308 may include a mobile payment application 309 that is activated in order to initiate or otherwise facilitate a payment transaction. The processor 302 of the mobile communication device 300 may execute the mobile payment application 309 or a processor included as part of the contactless element 308 may operate the mobile payment application 309. The mobile payment application 309 may access a data storage element 306 to obtain data used to participate in a payment transaction or to record or update a data record for a transaction. Additionally, the mobile payment application 309 may access a secure memory that is part of the contactless element 308. Furthermore, the data stored in the secure memory may be encrypted to provide further security. The mobile payment application 309 may communicate and exchange data with other elements of device 302 as the result of an application programming interface (API) or other suitable form of interface, or as a result of interactions with a controller or application that functions to receive data inputs from a user and provides the received data to the mobile payment application 309.

The processor of the contactless element 308 or the processor 302 of the mobile communication device 201 may perform one or more authentication or verification processes or operations prior to allowing a user to access the functions of the mobile payment application 309 or data associated with the mobile payment application 309. In some embodiments of the present invention, such authentication or verification processes or operations may include verifying that a user has provided the mobile payment application 309 with the correct secret token through entering a user authentication token that is correlated to a secret reference token, and that the secret token (or other user provided identification or authentication data) is valid. If the secret token is sufficiently correlated to a secret reference token and the user provided identification or authentication data are valid, then the functions of the mobile payment application 309 will be "unblocked", "activated", or otherwise made available to the user such that a transaction can be processed.

Additionally, the processer of the contactless element 308 or the processor 302 of the mobile communication device 302 may perform an application authentication by displaying, to the user, an application authentication element. The application authentication element may include a pre-selected authentication element and transaction data associated with a transaction conducted by a mobile communication device. Accordingly, if the user recognizes their pre-selected authentication element and relevant transaction data, they may be reassured that the application is legitimate and enter their user authentication token or other sensitive information.

Figure 4:
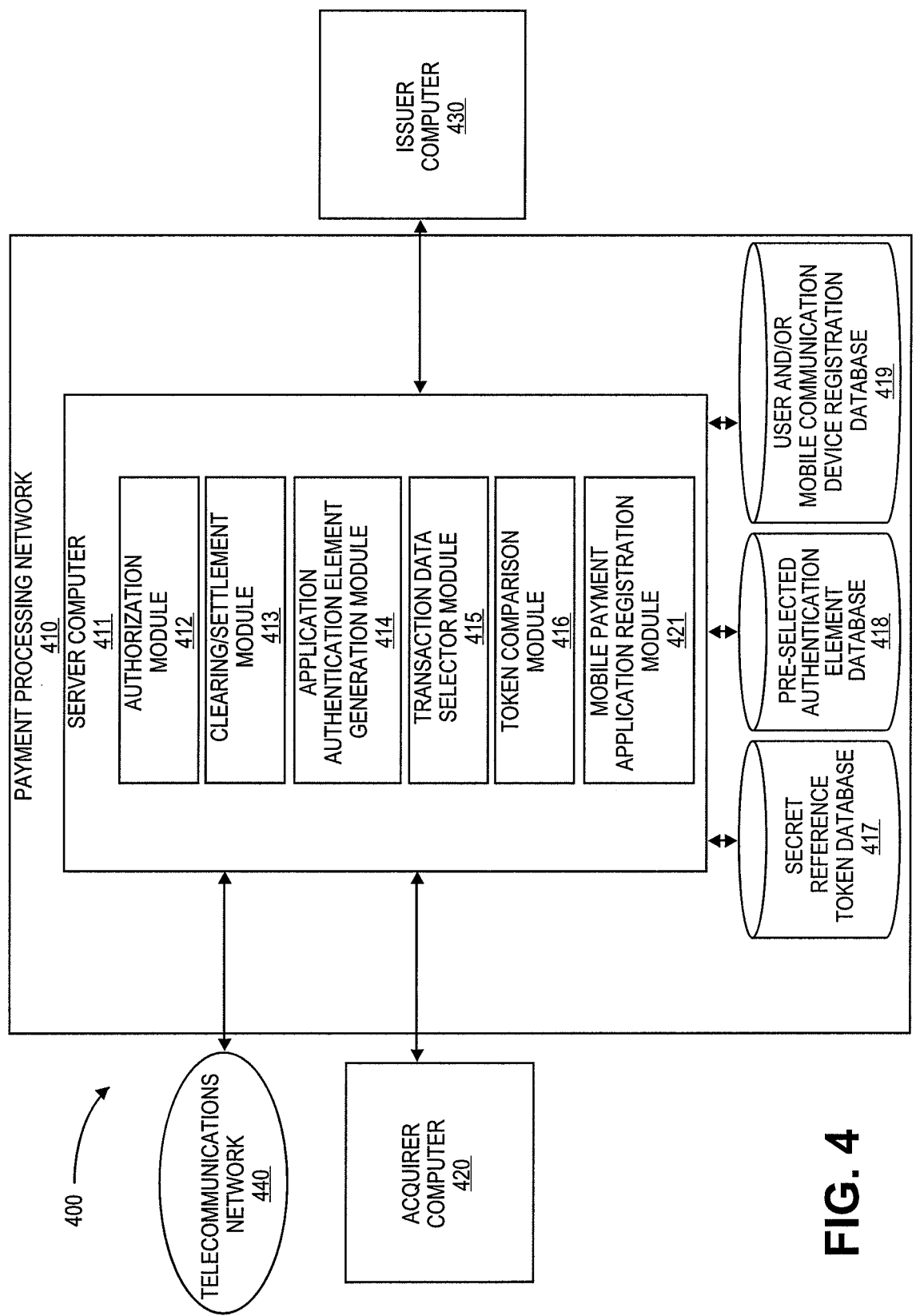
FIG. 4 shows a block diagram of an exemplary embodiment of a payment processing network in a portion of a transaction processing system.

FIG. 4 is a block diagram of an exemplary embodiment of a payment processing network 410 in a portion of a transaction processing system 400 including a payment processing network 410, acquirer computer 420, issuer computer 430, and telecommunications network 440. The payment processing network 410 may be contacted during all types of transactions including both person-to-person transactions and consumer-merchant transactions. The payment processing network 410 may receive transaction communications directly from a mobile communication device via a telecommunications channel 440 or through relayed messages from an acquirer computer 420. For example, a user may initiate a person-to-person transaction using a mobile communication device that sends an application authentication message directly to the payment processing network server computer 411 via the telecommunications network 440.

Alternatively, the user or a merchant access device may initiate a consumer-merchant transaction through an access device. If a transaction is originated through an access device such as a POS device, the payment processing network server computer 411 may still receive messages directly from the mobile communication device through the telecommunications network 440 for some processes. For example, the server computer 411 of the payment processing network 410 may still receive application authentication messages directly from a mobile communication device via the telecommunications network 440 prior to or during a transaction that will be processed through an access device. Alternatively, all the communications with the mobile communication device may occur through the access device by relaying messages through an acquirer computer 420.

In some embodiments, the payment processing network 410 may comprise a server computer 411, a secret reference token database 417, pre-selected authentication element database 418, and a user and/or mobile communication device registration database 419. The secret reference token database 417 may be used by the server computer 411 to store secret reference tokens that the server computer 411 receives from mobile communication devices. The secret reference tokens may be stored in the secret reference token database 417 in any manner such that the server computer 411 can easily find the appropriate secret reference token. The server computer 411 may use a mobile payment application registration module 421 to register the user with the mobile payment application and create data records associated with the user and/or the mobile communication device in a user and/or mobile communication device registration database 419. The server computer 411 may then determine any information related to the user and/or the mobile communication device being operated by the user by requesting information with the appropriate user or mobile communication device registration information from the user and/or mobile communication device registration database 419. The server computer 411 may also receive this information as part of transaction information received from a mobile communication device during or prior to a transaction.

The pre-selected authentication element database 418 may be used by the server computer 411 to store pre-selected authentication elements for users. Similar to the secret reference token database 417, the pre-selected authentication elements may be stored corresponding to a user or a mobile communication device being operated by a users such that the server computer 411 can access the appropriate pre-selected authentication element when requested. The user and/or mobile communication device registration database 419 may be used by a mobile payment application registration module 421 to store user registration data or registration data of the mobile communication device that is being operated by the user. The user and or device information may be used by the server computer 411 to find other information stored in other databases or could be used to identify the user or device that is requesting information or an action.

The server computer 411 may comprise an authorization module 412, a clearing and settlement module 413, an application authentication element generation module 414, a transaction data selector module 415, a token comparison module 416, and a mobile payment application registration module 421. The modules may interact and/or communicate with one another. Additionally, the modules may include any necessary components or software in order to perform their function or functions. Computer code for performing the functions of the above-described modules may be present on a computer readable medium that causes a processor to execute the function.

The authorization module 412 and clearing and settlement module 413 are typical modules that the server computer may use during any transaction. These modules authenticate user information and organize the settlement process of user accounts between acquirer computers 430 and issuer computers 420.

The application authentication element generation module 414 receives requests for an application authentication element and generates the application authentication element. The application authentication element generation module 414 retrieves information related to the user or the device being operated by the user to request the application authentication element from the user and/or device registration database 419. The application authentication element generation module 414 may retrieve an appropriate pre-selected authentication element by correlating the user or device information with a pre-selected authentication element from the pre-selected authentication element database 418. The application authentication element generation module 414 also receives transaction data from the transaction data selector module 415. The application authentication element generation module 414 then generates an application authentication element using the retrieved authentication element and the received or selected transaction data. Any of the described module functionality may be incorporated into the application authentication element generation module 414. Alternatively, the functions may be separated into further sub-modules.

The application authentication element can be generated in many different ways depending on the type of authentication element being used. For example, if the authentication is a picture, the application authentication element may be generated by superimposing transaction data onto the picture so that the user can see both the pre-selected authentication element as well as transaction data that is relevant to the current transaction (see, for example, FIG. 14). In another example, if the pre-selected authentication element is an audio clip, the application authentication element generation module 414 may generate the application authentication element by superimposing a transaction amount into the audio clip. For instance, the pre-selected authentication element audio clip may have stated "I want to pay" and in return the application authentication element may be a audio file that when played through the speakers of the mobile payment device may state "I want to pay $153.55," for a transaction worth $153.55. Any variation is possible as well, including the use of any transaction information as the selected transaction data. For example, when played the audio file may state "I want to pay ABC Corporation." Further variation may include any relevant transaction information associated with a transaction. After generating the application authentication element, the server computer 411 then transmits the application authentication element to the mobile communication device via the acquirer computer 420 or the telecommunications network 440. The mobile communication device may then display or play the application authentication element for the user.

The transaction data selector module 415 selects transaction data from relevant transaction information associated with a transaction conducted by a mobile communication device. The transaction data selector module 415 receives transaction information from the mobile device through the telecommunications network 440 or from the access device through the acquirer computer 420 and selects transaction data to include in the application authentication element. The transaction data may be determined randomly or selectively. For example, the transaction data could always be the same type of information (e.g. merchant name, transaction amount) for every transaction. Additionally, transaction data may be a portion of the transaction information or all the transaction information. Finally, the transaction data may also be a combination of different portions of the transaction information. For example, transaction data could comprise the street name from a user that is involved in a transaction as well as the transaction amount of the transaction.

The token comparison module 416 is used to compare secret tokens during or before a purchase transaction to authenticate a user so a typical payment transaction may proceed. The token comparison module 416 may receive a secret token from a mobile communication device or from one of the other modules or entities in the transaction processing system. The token comparison module 416 may determine the identity of the user or mobile communication device that is originating the transaction by retrieving this information from the user and/or mobile communication device registration database 419, be provided this information from another module in the server computer 411, or the information may be contained in the request for user authentication. The token comparison module 416 may then use the identification information to retrieve a secret reference token that corresponds to the user or mobile communication device from the secret reference token database 417. The token comparison module 416 may contain any suitable comparison components or software that may compare two pieces of information. For example, the comparison may be bit-by-bit where each binary bit is compared to ensure they are the same. Additionally, in some embodiments, the comparison may be based on predetermined patterns or known authentication behavior from past comparisons. There may also be multiple types of comparisons that occur, for example, first a bit-by-bit comparison may occur and then a pattern recognition comparison may occur.

Furthermore, the token comparison module 416 could implement any comparison technique that one of ordinary skill would recognize given the type of data being compared. For instance, there may be different comparison techniques depending on the type of data being compared. For example, a swipe may have a different set of pattern recognition for errors than a signature or a picture. As such, the token comparison module 416 may be able to tell what type of token is being retrieved from the secret reference token database and may alter the comparison technique accordingly. This type of secret token information may be stored with the secret reference token as flag or a "type of entry" field or could be determined by the type of data format of the secret reference token. Additionally, there may be multiple secret reference token databases for each type of user authentication token.

Finally, a mobile payment application registration module 421 may be used to register information about the users of mobile communication devices. The mobile payment application registration module 421 may be activated during the first use of the mobile payment application to implement an initialization or registration phase where users would choose their pre-selected authentication element as well as their user authentication token. The mobile payment application registration module 421 may receive information about the user during an installation or initial registration period as well. For example, in order for a user to download the mobile payment application on their mobile communication device, the user may have to provide account information so that the mobile payment application may know what account to charge during transactions. The mobile payment application registration module 421 would facilitate the registration process and store the information in a user and/or mobile communication device registration database 419 so that any transactions generated by the user would be identified as originating from the user. The mobile payment application registration module 421 may be implemented in a number of different ways as one of ordinary skill in the art would recognize. For example, the registration may be implemented through the application itself through a series of messages sent back and forth between the user and the payment processing network. Additionally, the registration process could be implemented by the payment processing network or issuer computer without the user's input by automatically installing and registering users who have accounts with a particular issuer.

II. Exemplary Authentication Using Application Authentication Methods

Figure 5:
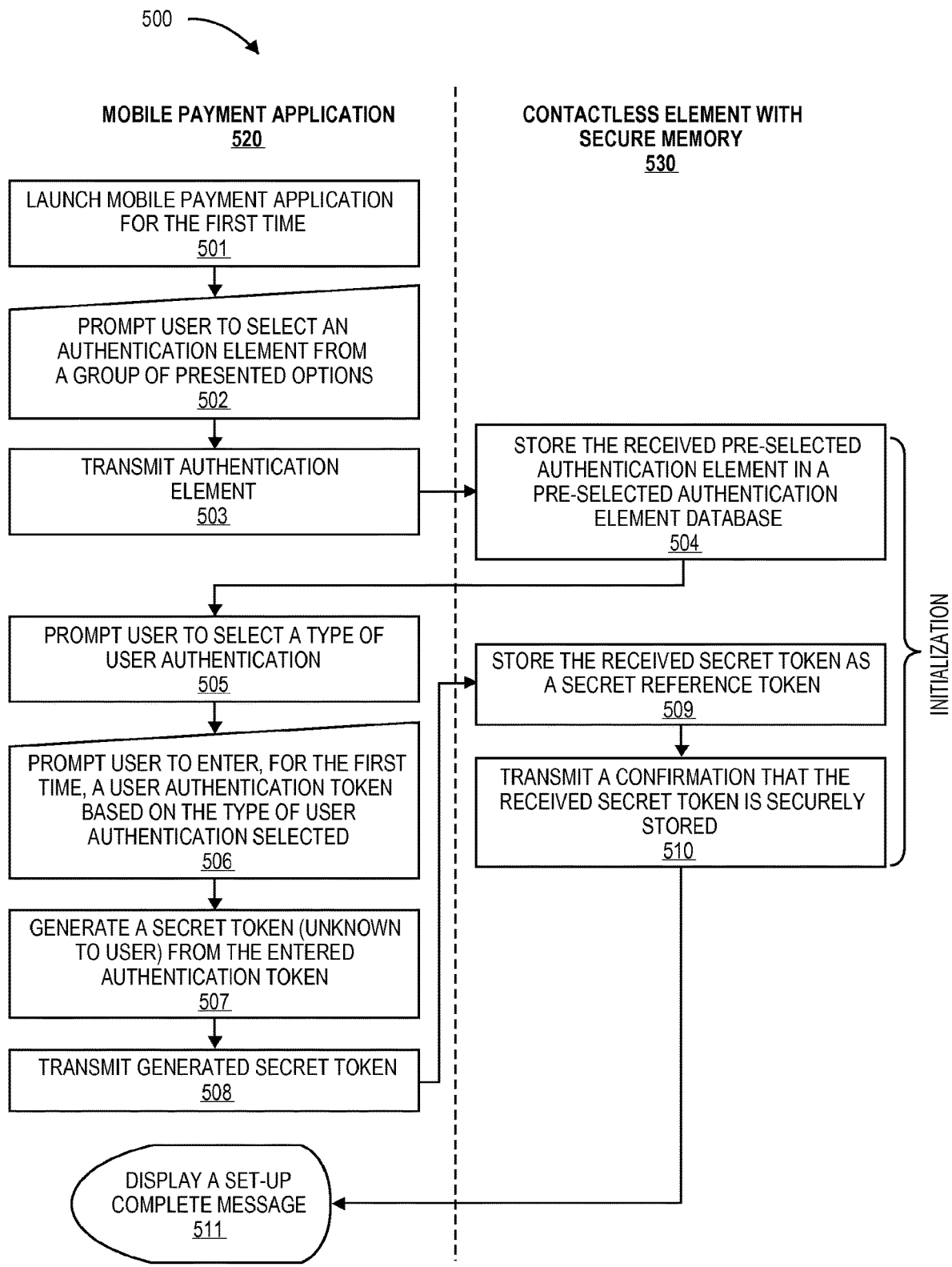
FIG. 5 shows a flow diagram of an exemplary initialization or registration phase of a mobile payment application.

FIG. 5 is a flow diagram of an exemplary initialization or registration phase 500 of the mobile payment application that may occur the first time the mobile payment application is opened or operated. In this exemplary embodiment, a contactless element including a secure memory 530 is used to store and access the sensitive authentication information.

In step 501, the user launches a mobile payment application 520 for the first time. The mobile payment application 520 may track whether a set up complete message has ever been received by the application and thus may not have to send a request to any other entity to determine whether the user has initialized the application before. The application may have an "initialization complete" flag or other such process for confirming that an initialization has occurred. As such, the application may ask every time the application is launched, whether initialization has occurred, and if not, the initialization phase may be entered.

Figure 8:
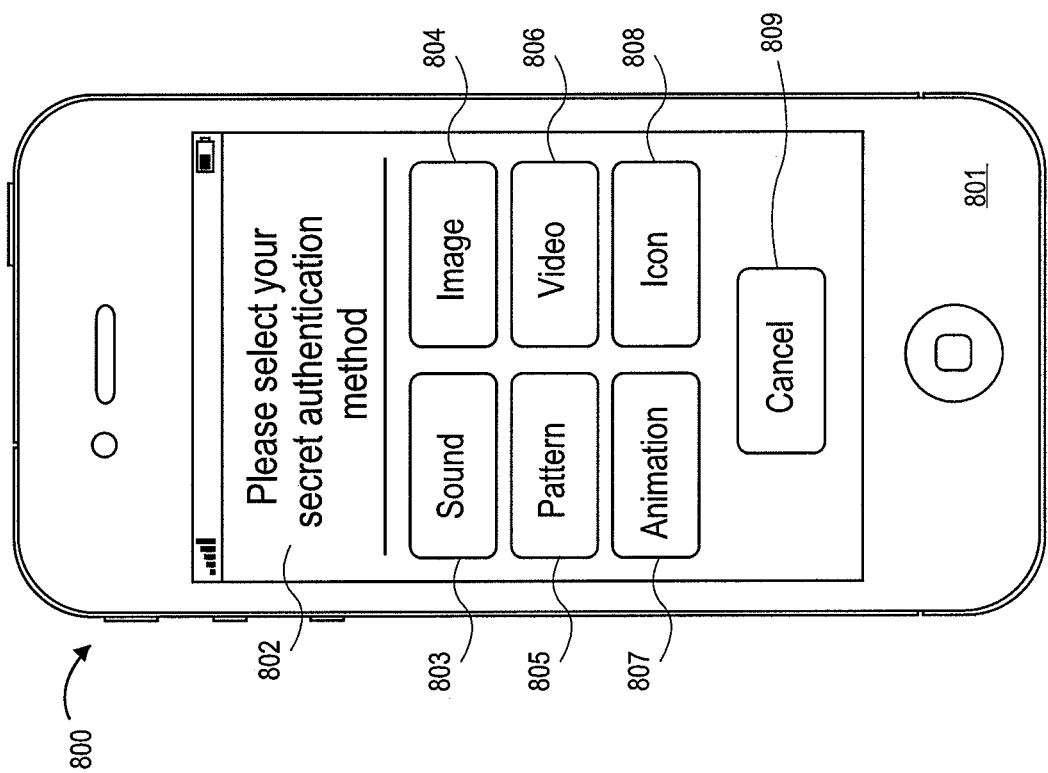
FIG. 8 shows an exemplary user interface of a mobile payment application during initialization phase displayed on a mobile communication device according to one embodiment of the invention.

In step 502, the user is prompted by the mobile payment application 520 to select an authentication element from a group of presented options. The mobile payment application 520 may provide the user a choice as to the type of pre-selected authentication element used or may merely provide the user with a single option. FIG. 8 shows an exemplary embodiment of a mobile payment application operating on a mobile communication device 801 prompting a user to select a type of pre-selected authentication element (803-808). In FIG. 8, the type of pre-selected authentication element allowable includes a sound 803, an image 804, a pattern 805, a video 806, an animation 807, and an icon 808. Additionally, the mobile payment application 520 may choose a pre-selected authentication element for the user and merely show the user the pre-selected authentication element that will be used for future transactions.

A user may also be provided with many choices and may be provided access to memory or functions on the mobile communication device or outside the mobile communication device while selecting an authentication element (e.g. allowed to take a new picture and set the picture as the pre-selected authentication element). For example, the pre-selected authentication element may comprise a picture, a graphic, a collection of words, letters, or numbers, an animation, a sound clip, or a video clip. If the user chose an image as the type of pre-selected authentication element, the user may be given an option to take a picture to use as their pre-selected authentication element or to upload a picture through an external application or device.

Figure 9:
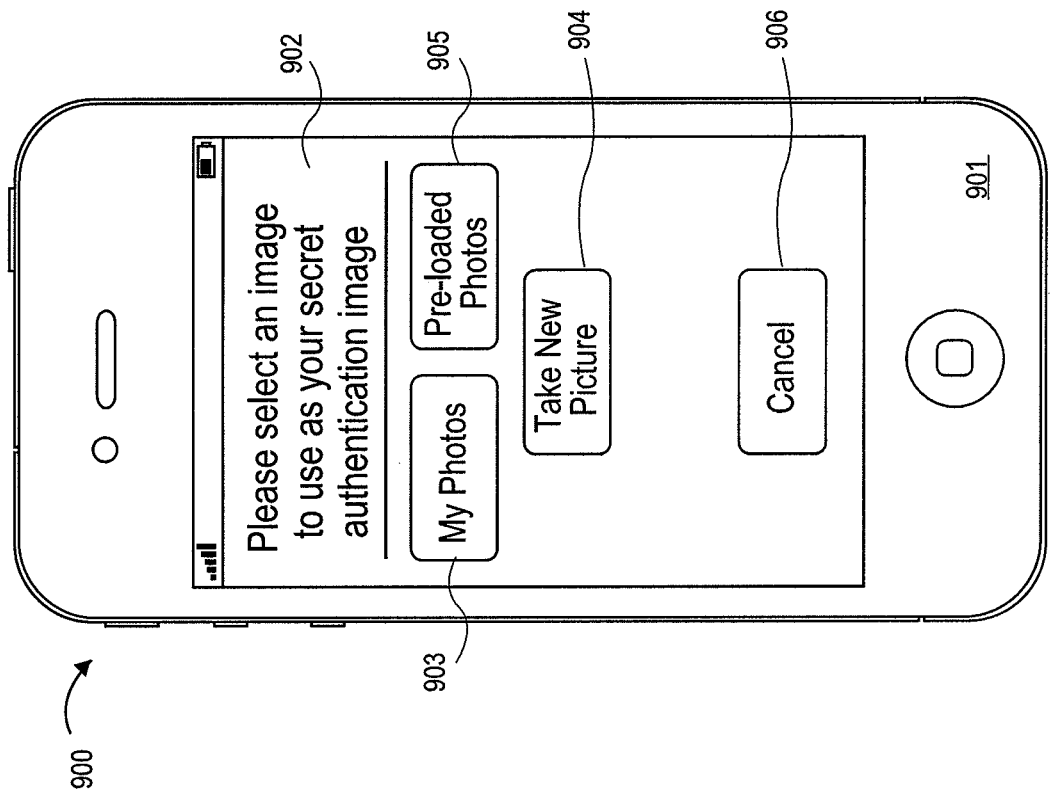
FIG. 9 shows an exemplary user interface of a mobile payment application during an initialization phase displayed on a mobile communication device according to one embodiment of the invention.
Figure 11:
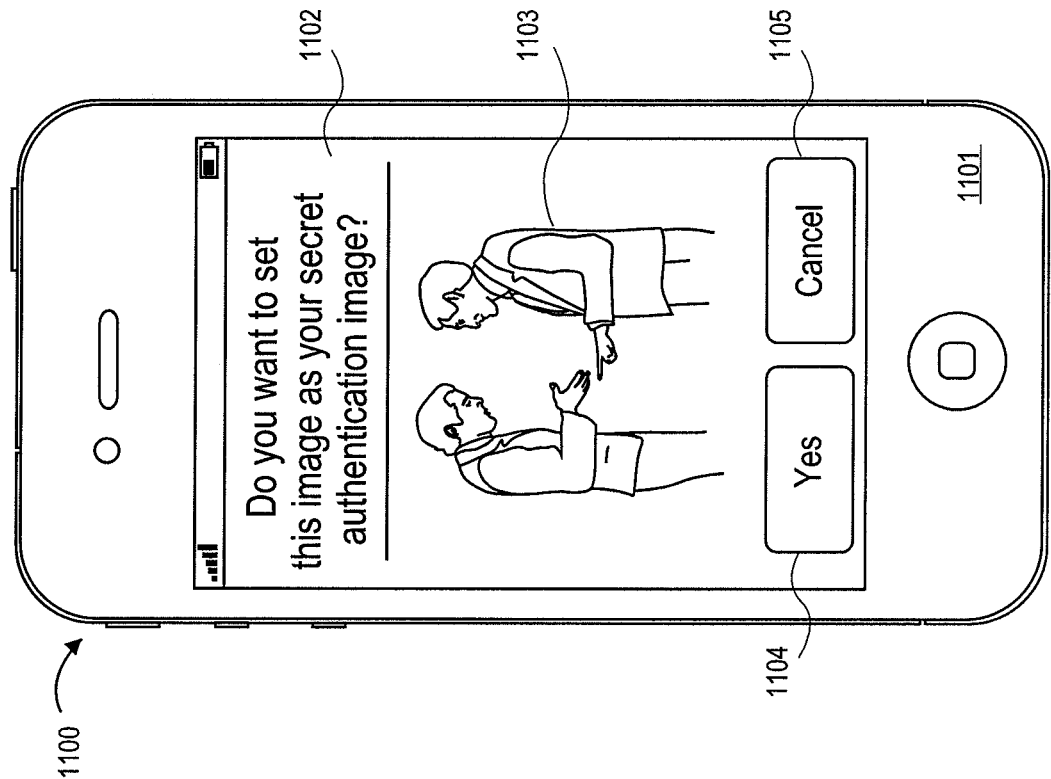
FIG. 11 shows an exemplary user interface of a mobile payment application during an initialization phase displayed on a mobile communication device according to one embodiment of the invention.
Figure 10:
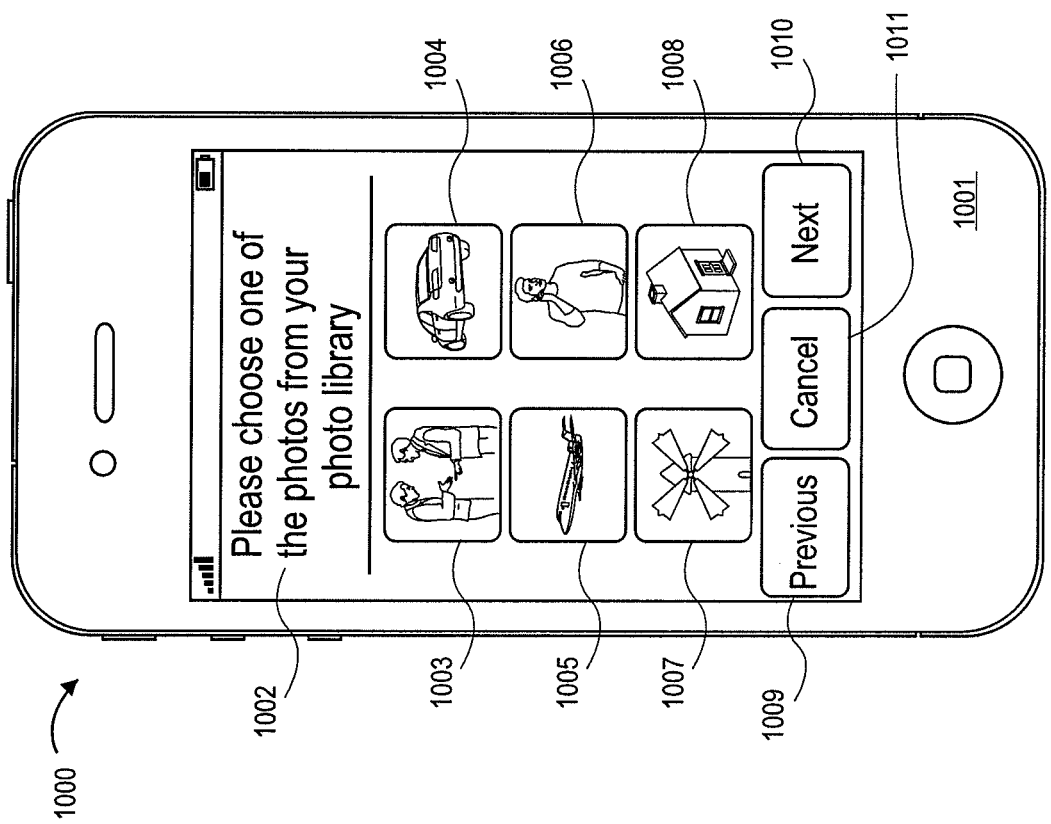
FIG. 10 shows an exemplary user interface of a mobile payment application during an initialization phase displayed on a mobile communication device according to one embodiment of the invention.

FIGS. 9-11 show exemplary user interfaces corresponding to step 502. FIG. 9 shows an exemplary embodiment of a mobile payment application operating on a mobile communication device 901 allowing a user to access a memory comprising by allowing the user to select a photo from a photo library by selecting a My Photos button 903. Additionally, the user is allowed to access the mobile communication device's camera by taking a new picture 904. In some embodiments, the user may be able to upload pictures from other applications or connected devices as well. FIG. 10 shows an exemplary embodiment of a mobile payment application operating on a mobile communication device 1001 where the user has chosen to use an image from their photo library located on a memory on the mobile communication device 1001. The user is provided with a menu showing the available pre-selected authentication element choices. The available images stored on the memory include two men shaking hands 1003, a car 1004, a plane 1005, a man on a phone 1006, a windmill 1007, and a house 1008. Additionally, buttons are provided for accessing further image options that may be available for the user to select as the pre-selected authentication elements. The mobile payment application may only disclose images that are formatted appropriately such that they can be used by the system as a pre-selected authentication element or are modifiable to a format that is usable. FIG. 11 shows an exemplary embodiment where the user has chosen the image of two men shaking hands 1103 as their pre-selected authentication element and are being asked to confirm that the image is their choice 1102.

In step 503, the mobile payment application 520 transmits the chosen or pre-selected authentication element to processor within the contactless element including a secure memory 530.

In step 504, the processor within the contactless element 530 stores the received pre-selected authentication element in a secure memory location. The pre-selected authentication element may be stored in a manner such that it is easily retrievable by the processor within the contactless element 530 for the use of the mobile payment application 520. Furthermore, the pre-selected authentication element may also be encrypted prior to being stored in order to further protect the pre-selected authentication element from third party applications.

In step 505, the mobile payment application 520 prompts the user to select a type of user authentication. As explained previously, there may be many different types of user authentication. For example, a mobile phone with a touch-screen could allow a user to input information through touching the screen with a finger or stylus. Other possible types of user authentication inputs could be voice input through the phone's microphone, characters or numbers input through the mobile device's digital or analog keyboard, pictures or images input through a phone's camera, biometric information input through specialized data inputs on the mobile device, movements, positions, or accelerometer data input through the use of an accelerometer or internal compass in a mobile communication device, or any other information that can be captured by a mobile communication device through interaction with a user.

In step 506, the mobile payment application 520 prompts the user to enter, for the first time, a user authentication token based on the type of user authentication selected. The user authentication token may include a "swipe" where a user swipes a particular pattern on the mobile communication device's touchscreen using their finger, a signature using a finger or stylus on the touchscreen, a spoken statement or song, a drawing using the device's touchscreen, a picture of a familiar item, biometric data (e.g. picture of the user's iris, fingerprint, etc.) or any other repeatable input using one of the type of user authentication inputs described above.

As explained previously, the secret token may change in format or appearance depending on the type of user authentication selected by the user. For example, using the example above of a user swipe, the input may be binary or alphanumeric digits representing the sections touched by a user's swipe. However, in the case of a position or movement type of user authentication token, the secret token may correspond to digital values received from the accelerometer or internal compass of the mobile communication device. This data may be completely different from a secret token generated using a swipe including the length of the data pattern, the value range, the variation in data strings, etc.

In step 507, the mobile payment application 520 generates a secret token that is unknown to the user from the entered authentication token. As explained previously, the secret token is derived from the user authentication token and depends on the type of user authentication selected by the user. Furthermore, the generation of the secret token is not apparent to the user or is unknown by the user and the user may not access the secret token.

In step 508, the mobile payment application 520 transmits the generated secret token to the secure memory within the contactless element 530. Similar to the transmission of the pre-selected authentication token, the secret token is sent to the contactless element containing a secure memory 530.

In step 509, the processor within the contactless element 530 stores the received secret token as a secret reference token on the secure memory. The secret reference token may be stored in a manner such that it is easily retrievable by the processor within the contactless element 530 or another processor executing the mobile payment application 520. Furthermore, the secret reference token may also be encrypted prior to being stored in order to further protect the secret token.

In step 510, the processor within the contactless element 530 transmits a confirmation message to the mobile payment application 520 that the received secret token is securely stored. The confirmation message allows the mobile payment application 520 to confirm that the initialization or registration phase is over and that the next time the mobile payment application 520 is used, the user will need to be authenticated using the stored authentication element and secret reference token.

Finally, in step 511, the mobile payment application 520 displays a set-up complete message for the user so that the user knows their pre-selected authentication token and secret reference token have been stored successfully by the mobile payment application 520.

In some embodiments, a server computer 411 with a mobile payment application device registration module 417 could replace the contactless element with a processor and secure memory 530 and the authentication element and secret token would be transmitted over a telecommunication network or through a transaction processing system via an access device to the server computer 411. In such embodiments, the initialization process as detailed below would be similar but the pre-selected authentication element and the secret reference token may be saved in a pre-selected authentication element database and a secret reference token database instead of secure memory on the mobile communication device. In embodiments including a server computer, the mobile payment application 520 may transmit the pre-selected authorization element to the server computer using any suitable messaging protocol and any suitable number of messages.

Now that the initialization phase has been successfully accomplished the mobile payment application 520 may be used to conduct a payment transaction using an application authentication element and a user authentication token. Embodiments of the present invention may be implement on transactions of any kind including person-to-person payments or consumer-merchant transactions using a mobile communication device. Mobile person-to-person transactions are typically initiated by a mobile communication device directly communicating with a server computer of a payment processing network through a telecommunications network. Mobile consumer-merchant transactions typically occur through a mobile communication device communicating with an access device which then relays messages to a server computer of a payment processing network. However, communication may also occur between the mobile communication device and the server computer through a telecommunications network.

Figure 6:
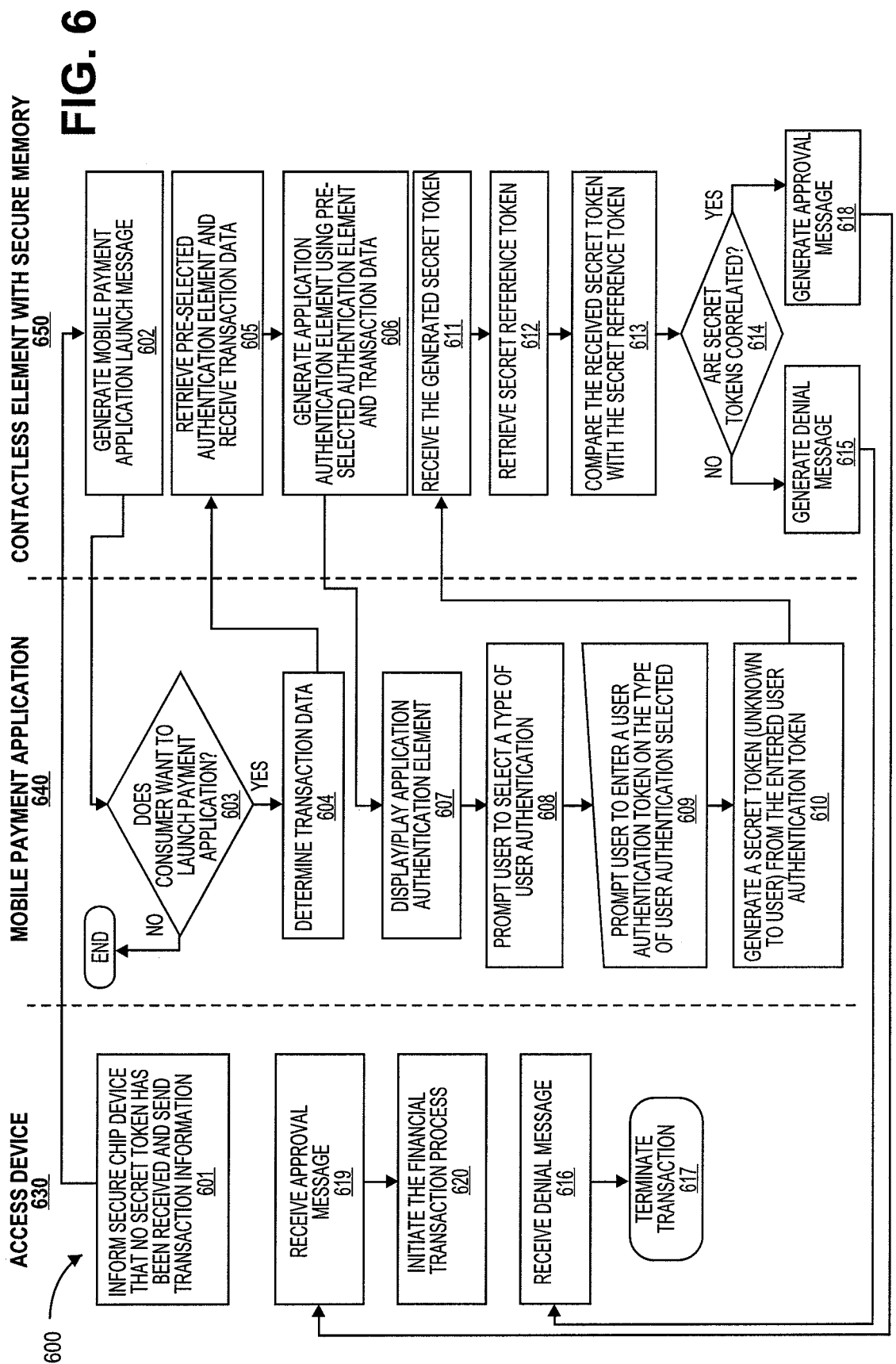
FIG. 6 shows a flow diagram of a mobile payment transaction using a mobile communication device according to an exemplary embodiment of the present invention.
Figure 7:
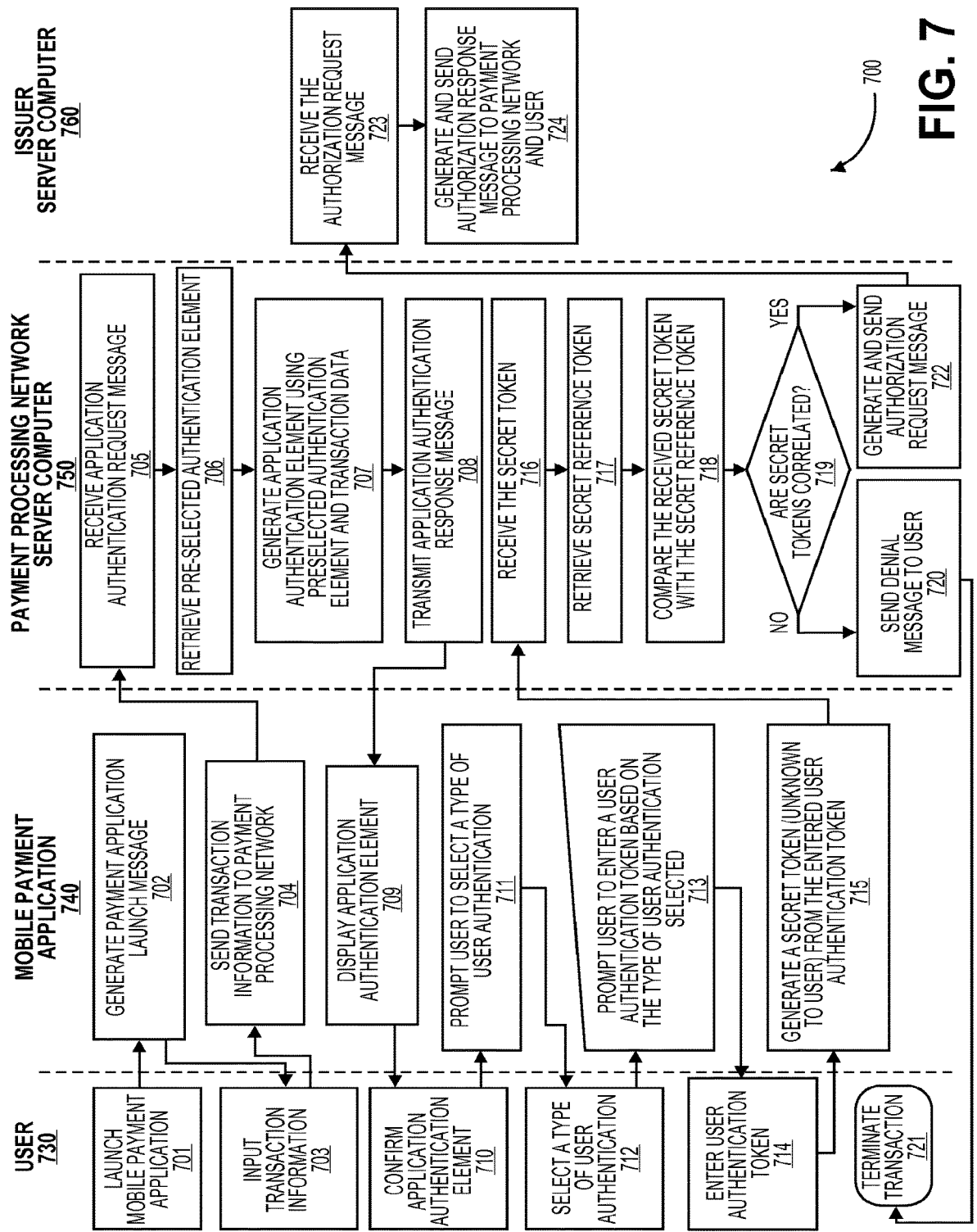
FIG. 7 shows a flow diagram of a mobile payment transaction using a mobile communication device according to an exemplary embodiment of the present invention.

The flow diagrams of FIGS. 6 and 7 are directed to two different modes of accessing authentication information. FIG. 6 shows a typical transaction using an access device where the authentication information is contained on the mobile communication device so a payment processing network is not required to process the transaction until the application and the user have been authenticated by the mobile payment application using the information stored on the secure memory. In contrast, FIG. 7 is directed to a method where the application and user authentication information is stored in databases within a payment processing network. Accordingly, both systems may perform any type of transaction (person-to-person, person-to-merchant, merchant-to-merchant) and the exemplary embodiment defined in the figures should not be read to limit the application of the features to particular types of transactions.

FIG. 6 shows a flow diagram of an exemplary mobile payment transaction using a short range communication capability, such as a near field communications (NFC), of the mobile communication device and an access device or card reader (POS) 630. Examples of such NFC technologies or similar short range communications technologies include ISO standard 14443, RFID, Bluetooth™ and Infra-red communications methods. In this example, a user operating a mobile communication device has entered the proximity of an access device with near field communication capabilities and a transaction that may be waiting for processing. The NFC components of the access device will try to communicate with any available mobile communication device that is in the surrounding area. The NFC components of each device may establish a wireless communication link between the mobile communication device and the access device.

In step 601, the access device informs a processor within the contactless element 650 that no secret token has been received and provides transaction information associated with a transaction. Once the wireless communication link is established between the access device 630 and the contactless element 650 of the mobile communication device, the access device 630 may transmit a message to the processor within the contactless element 650 containing transaction information and informing the processor within the contactless element 650 that it has not received a secret token from the mobile communication device. The transaction request message may be generated in any suitable manner. For example, the access device may only transmit a transaction request message through the NFC components when a clerk at the access device presses a proximity payment button. Alternatively, the transaction request message may be transmitted during all transactions.

In step 602, a processor within the contactless element 650 generates a mobile payment application launch message. Alternatively, instead of waiting for the establishment of the wireless communication link between the access device 630 and the contactless element 650 based on their physical proximity, the consumer may opt to launch the mobile payment application on the mobile communications device while, for example, waiting in line to pay for the goods.

Figure 13:
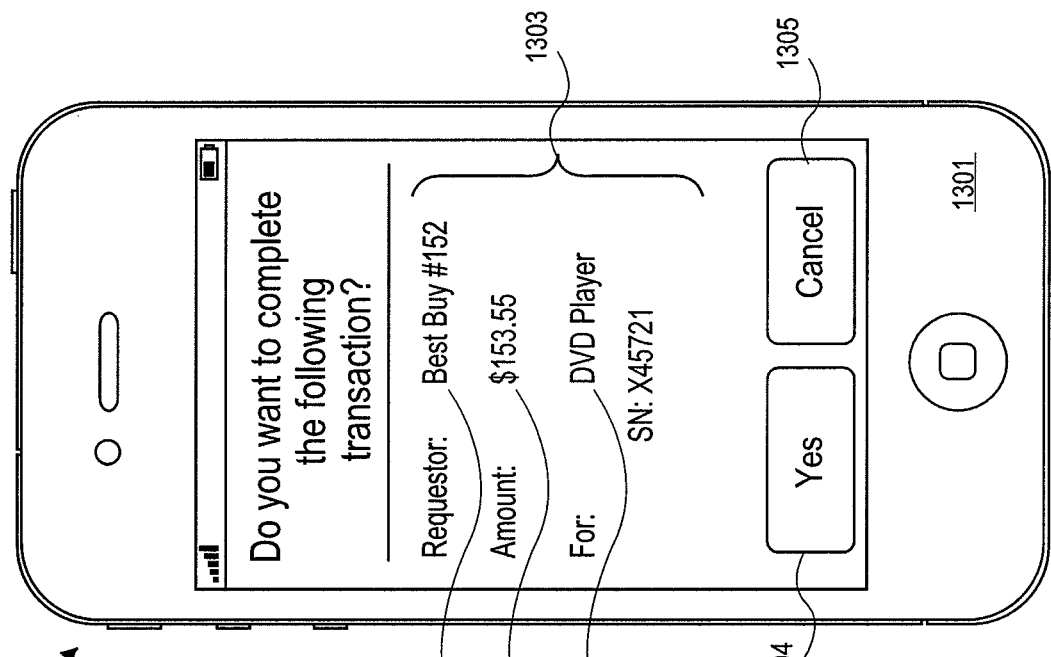
FIG. 13 shows an exemplary user interface of a mobile payment application during a transaction request displayed on a mobile communication device according to one embodiment of the invention.

In step 603, the mobile payment application asks the user whether the consumer wants to launch the payment application. This question may be displayed to the user on the mobile communication device and the display may contain transaction information so the user can determine who is requesting the transaction, the amount of the transaction, etc. and can make an informed decision regarding whether to continue. If the consumer believes the transaction request is an error, changes their mind about the transaction, or decides to use a different payment method, they can simply ignore the request or press no, decline, cancel or any other affirmative response that they are not interested in launching the transaction. However, if the consumer does want to proceed with the transaction, they may simply respond with a yes, continue, etc. to start processing the transaction using the mobile payment application. FIG. 13 shows one illustration of this exemplary embodiment of displaying a request to launch the mobile payment application. The user is provided with a request to continue 1302, transaction information 1303 including requestor identity 1303-A, transaction amount 1303-B, and product type 1303-C.

In step 604, the mobile payment application selects transaction data from the transaction information to include in an application authentication element. This transaction data may be determined through any method as would be recognized by one of ordinary skill in the art. The transaction data may be determined randomly or selectively. For example, the transaction data could always be the same type of information (e.g. merchant name, transaction amount).

In step 605, the processor within the contactless element 650 may retrieve the pre-selected authentication element from a secure memory within the contactless element and/or mobile communication device. The pre-selected authentication element may be stored on the secure memory to ensure the pre-selected authentication element is only accessible by an authentic mobile payment application or else the pre-selected authentication token could be accessed by a unauthorized fraudulent or rogue application. The secure memory may be within the contactless element 650 or in another secure memory in the mobile communication device. The processor within the contactless element 650 may also receive the selected transaction data.

In step 606, the processor within the contactless element 650 generates an application authentication element using the retrieved pre-selected authentication element and the transaction data. The application authentication element may be a graphic, sound clip, video clip, animation, or any other media or non-media element that may be transmitted and displayed or played to a user through a mobile communication device. The application authentication element may be generated by using portions of the pre-selected authentication element and transaction data or may incorporate both in entirety.

In step 607, the mobile payment application on the mobile communication device may display an application authentication element comprising a pre-selected authentication element and transaction data associated with a transaction conducted by a mobile communication device to the user. The application authentication element may be displayed or played for a long period of time or only briefly. Furthermore, the application authentication element may be displayed until the user agrees to proceed so that the chances that the user saw or heard the application authentication element are maximized. FIG. 14 shows an exemplary embodiment of a mobile communication device 1401 displaying an application authentication element 1403 comprising both a pre-selected authentication element 1404 and transaction data 1405.

In step 608, the mobile payment application prompts the user to select a type of user authentication. Now that the user has been reassured that the application requesting their user authentication token is authentic, the user may now proceed with entering the user authentication token without fear that the user authentication token will be compromised. There may be many different types of user authentication that the mobile payment application operating on the mobile communication device may accept. For example, a mobile phone with a touchscreen could allow a user to input information through touching the screen with a finger or stylus. Other possible types of user authentication inputs could be voice input through the phone's microphone, characters or numbers input through the mobile device's digital or analog keyboard, pictures or images input through a phone's camera, biometric information input through specialized data inputs on the mobile device, movements, positions, or accelerometer data input through the use of an accelerometer or internal compass in a mobile communication device, or any other information that can be captured by a mobile communication device through interaction with a user. Some embodiments may allow multiple user authentication tokens including one or more user authentication tokens for each type of user authentication. FIG. 15 shows an exemplary embodiment of a mobile communication device 1501 prompting a user to select a type of user authentication (1503-1509). In FIG. 15, the type of user authentication options include a swipe 1503, a typed word or phrase 1504, voice 1505, drawing a picture 1506, fingerprint 1507, handwriting recognition 1508, and a movement or position 1509.

Additionally, in some embodiments, the mobile payment application may not provide the user a choice as to the type of user authentication. The mobile payment application may determine the type of user authentication that was entered during the initialization phase by the user and ask for the user to enter the corresponding user authentication token.

Figure 17:
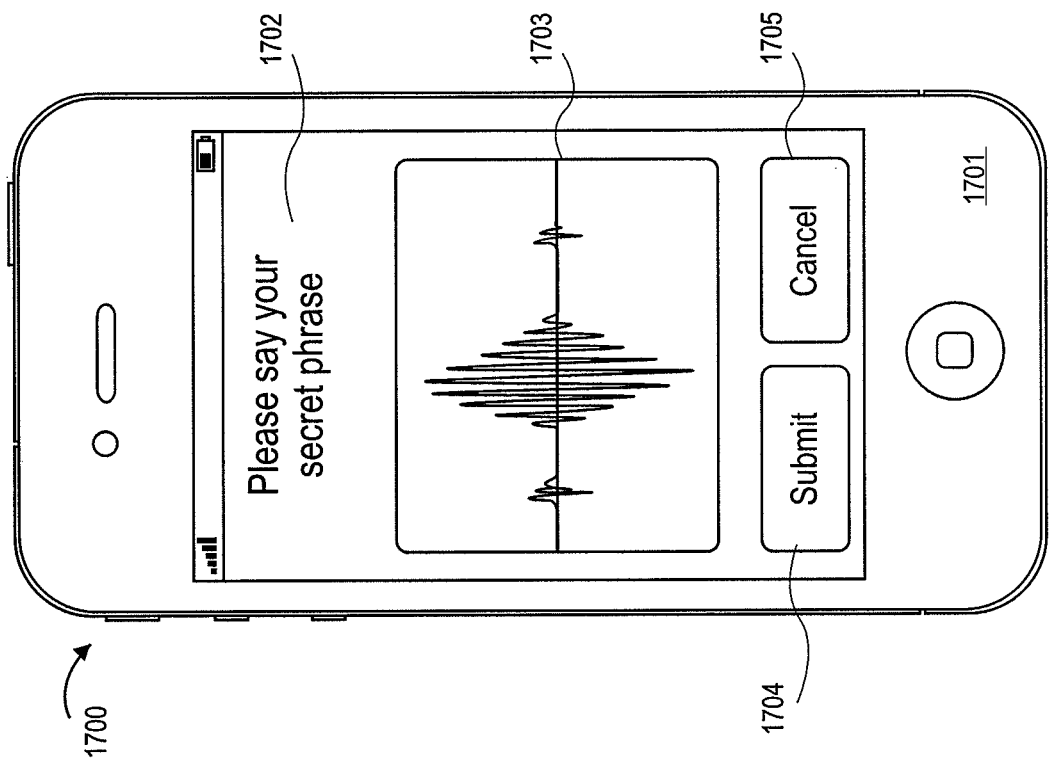
FIG. 17 shows an exemplary user interface of a mobile payment application prompting a user to enter a user authentication token displayed on a mobile communication device according to one embodiment of the invention.
Figure 16:
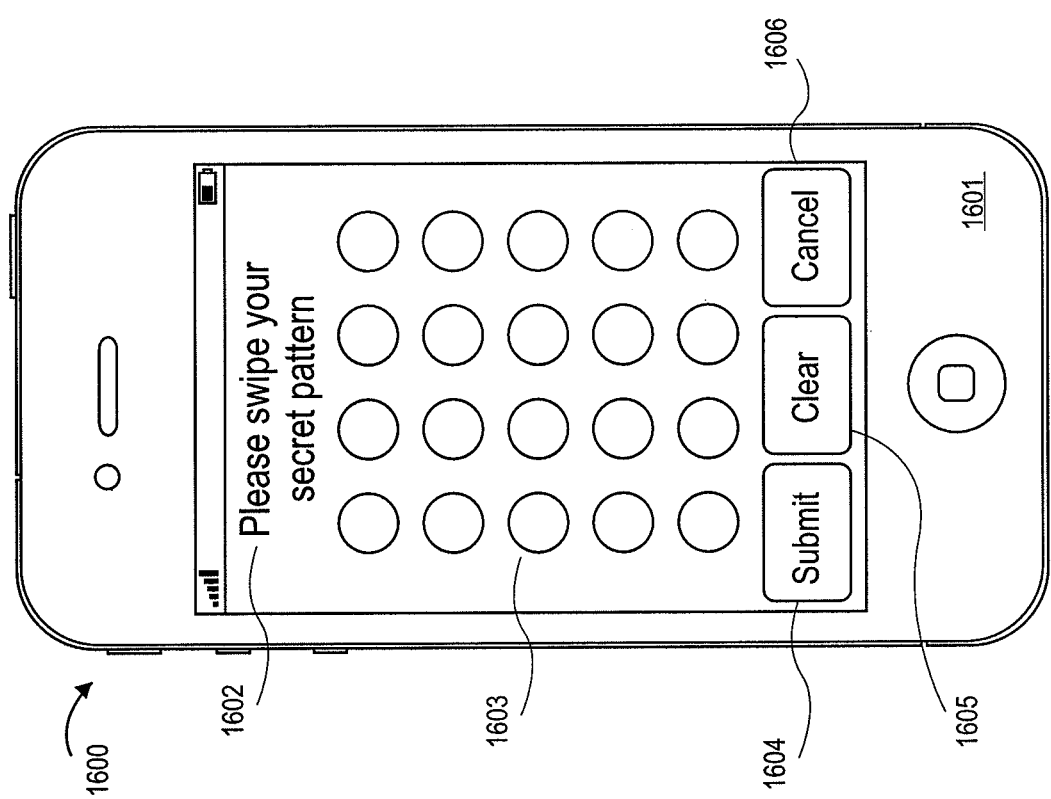
FIG. 16 shows an exemplary user interface of a mobile payment application prompting a user to enter a user authentication token displayed on a mobile communication device according to one embodiment of the invention.
Figure 18:
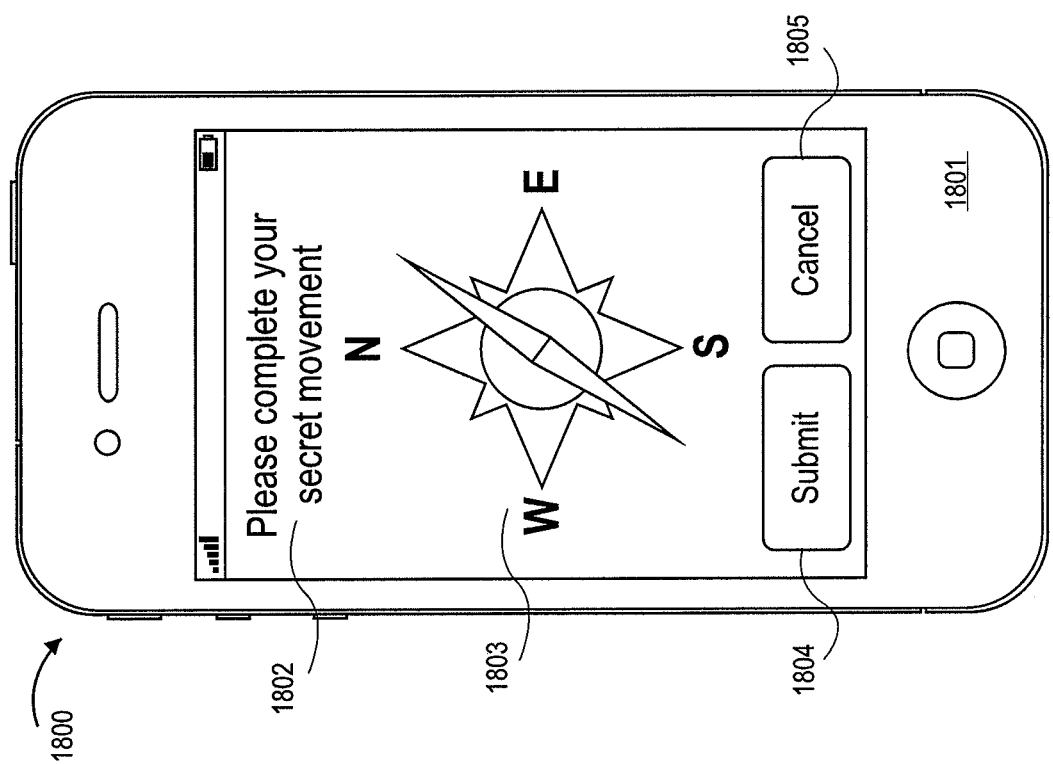
FIG. 18 shows an exemplary user interface of a mobile payment application prompting a user to enter a user authentication token displayed on a mobile communication device according to one embodiment of the invention.

In step 609, the mobile payment application prompts a user to enter a user authentication token using the type of user authentication selected. The user then enters the authentication using the selected type of user authentication and the mobile communication device receives, by the mobile communication device and from the user, a user authentication token. The user authentication token may be provided through any appropriate data input on the mobile communication device. Additionally, the user may be provided with an option to review the user authentication token prior to submitting the user authentication token to the mobile payment application. FIGS. 16-18 show exemplary user interfaces 1600, 1700, 1800 prompting a user to enter a user authentication token 1602, 1702, 1802 for different types of user authentication (a swipe 1603, voice recognition 1703, and a movement or position 1803) displayed on a mobile communication device 1601, 1701, 1801 according to one embodiment of the invention.

In step 610, mobile communication device generates a secret token that is derived from the user authentication token. As explained above, the mobile communication device may generate the secret token in any appropriate manner and the secret token is not displayed or shown to the user. The secret token may be generated through the use of an algorithm or program that may convert the user authentication token to a passcode. Depending on the type of user authentication, the method of generating the secret token may be very different for each type of user authentication.

In step 611, the processor within the contactless element 650 receives the generated secret token from the mobile payment application. The processor within the contactless element 650 may store the generated secret token for later processing if necessary or may process the secret token immediately.

In step 612, the processor within the contactless element 650 retrieves the secret reference token from the secure memory.

In step 613, the processor within the contactless element 650 may compare the received secret token with the secret reference token. As explained above, this comparison may be in any suitable fashion in order to determine whether the secret tokens are sufficiently correlated to allow the transaction to occur. For example, the comparison may occur through the processor within the contactless element executing a token comparison module that is implemented within the secure memory within the contactless element or other data storage. The comparison could be accomplished using bit-by-bit comparisons or by assigning a correlation or risk factor to the comparison. Finally, pattern recognition as well as behavioral tendencies based on the type of user authentication can be built into the comparison of the secret tokens to increase the comparison accuracy.

In step 614, the processor within the contactless element 650 determines if the secret tokens are sufficiently correlated. The determination of whether the secret tokens are sufficiently correlated may also be accomplished through any suitable means. For example, if a correlation or risk factor was determined in the prior step, this correlation factor could be compared to a low or high threshold value in order to determine if the secret tokens are too different to be considered correlated.

In step 615, if the secret tokens are not correlated the processor within the contactless element 650 generates a denial message and transmits the denial message to the access device through the mobile communication device.

Figure 20:
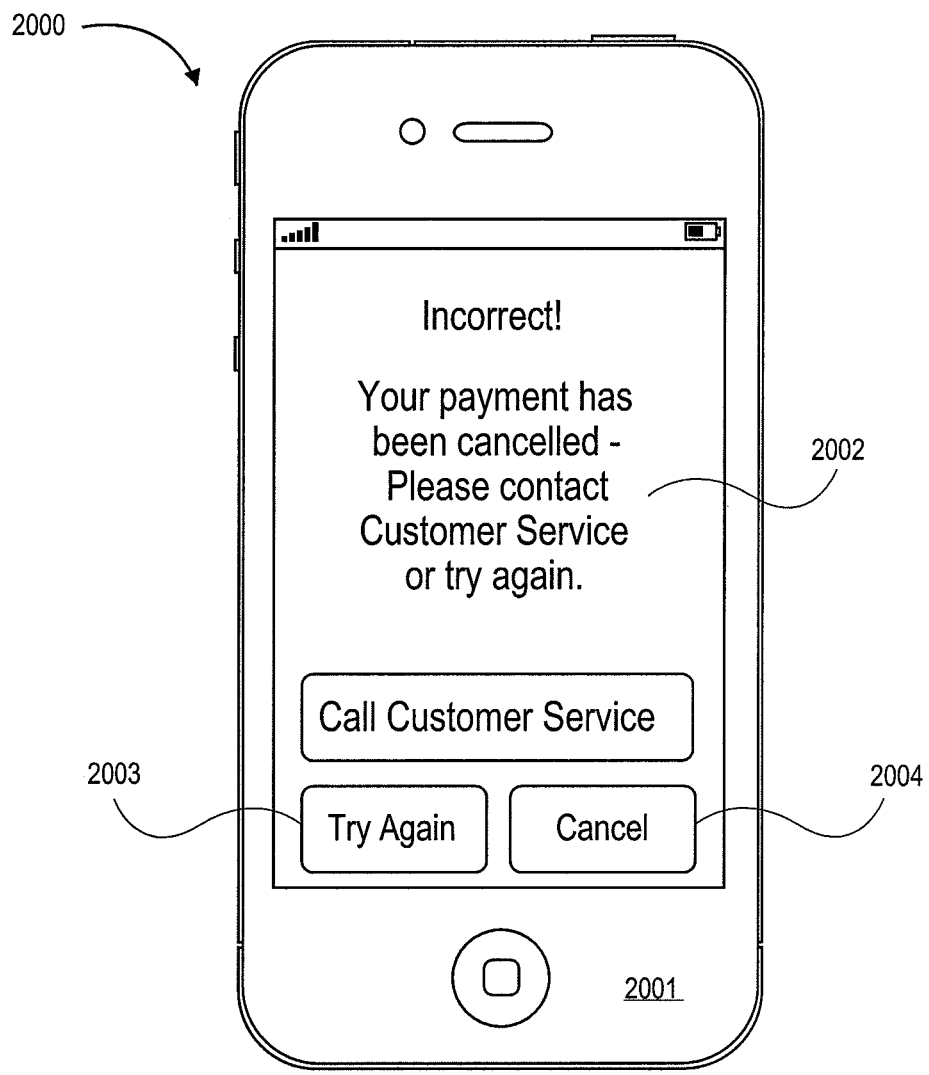
FIG. 20 shows an exemplary user interface showing a result of a denied user authorization according to one embodiment of the invention.

In step 616, the access device 630 receives the denial message. The denial message may be transmitted through the mobile payment application 640. As such, a denial message may be displayed to the user as well informing the user that the authentication and/or transaction was not successful. FIG. 20 shows an exemplary embodiment of the denial message 2002 displayed on the mobile communication device 2001. When the access device 630 receives the denial message, the access device 630 may immediately terminate the transaction or may allow the user to try the transaction again. Furthermore, the transaction may not be terminated but the user may be asked to pay through a different method (e.g. a physical payment transaction instead of proximity payment transaction). If the access device 630 allows a second attempt to process the mobile payment transaction, the process may restart from the first step or the user may be allowed to simply enter the user authentication token again.

In step 617, the access device terminates the transaction and will not accept any transaction from the mobile communication device even if the mobile payment application believes the transaction may continue. As such, the merchant is protected from a mobile payment application that is infected by malware or a fraudulent application, that tries to continue the transaction without a successful authentication.

Figure 19:
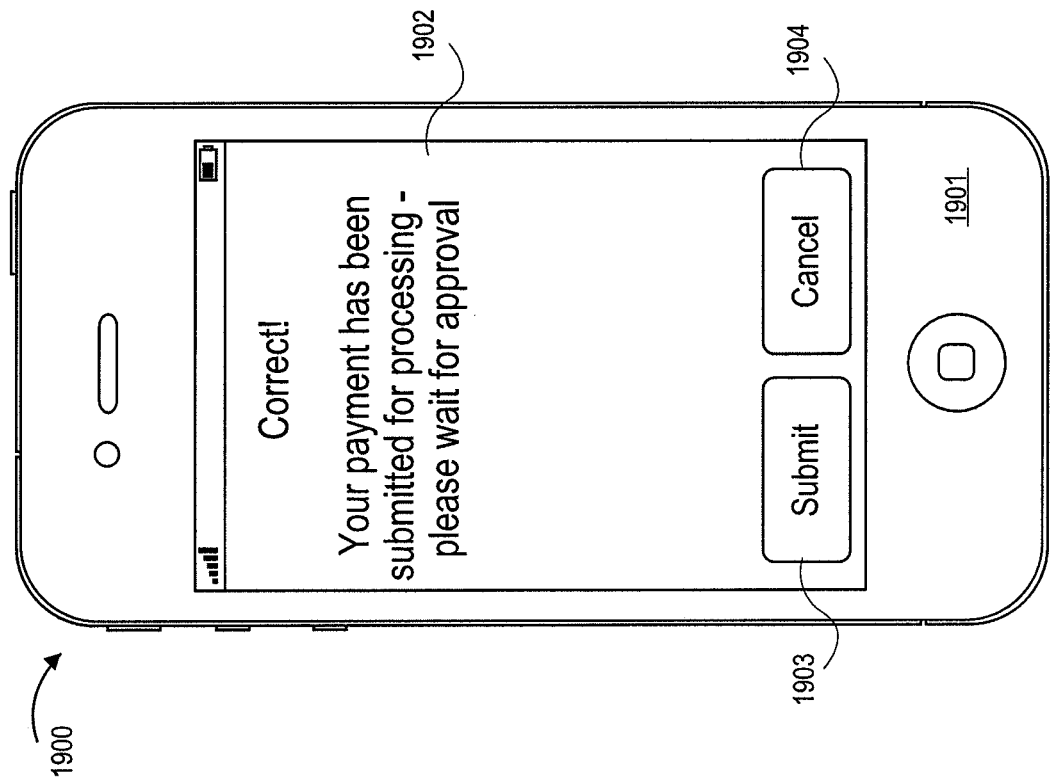
FIG. 19 shows an exemplary user interface showing a result of a successful user authorization according to one embodiment of the invention.

In step 618, if the secret tokens are correlated, the processor within the contactless element 650 generates an approval message and sends the approval message to the access device 630 via the mobile payment application 640. If the processor within the contactless element 650 determines that the secret tokens are correlated, the transaction is approved by the mobile payment application 640 and an approval message is sent to the access device 630 using the processor within the contactless element 650. The approval message may comprise all the remaining transaction data required to immediately process the transaction through a typical transaction processing through a payment processing network or the approval message may merely inform the access device that the user is authenticated. FIG. 19 shows an exemplary embodiment of an approval message 1902 displayed on the mobile communication device 1901 for the user.

In step 619, the access device 630 receives the approval message. The approval message may be in any suitable format to inform the access device that the user has been authenticated. If more transaction details are necessary to complete the transaction, the access device may send a request for such details but in the typical transaction, the access device will now perform a typical transaction authentication.

In step 620, the access device 630 initiates the financial transaction process. Accordingly, the user has initiated transaction processing using the mobile payment application on the mobile communication device. In order to conduct the transaction, the access device 630 may forward the transaction information to the server computer within the payment processing network via the acquirer computer and the transaction may be authorized through a regular transaction process including clearing and settlement by the payment processing network.

Although FIG. 6 is directed to a mobile communication device comprising an contactless element with a secure memory and a processor within the contactless element 650 executing the required transaction processes, in some embodiments, a processor within the main mobile device circuitry may execute these steps and communicate with the secure memory through a contactless element interface. Furthermore, the secure memory may be separate from the contactless element and the contactless element may be used for data transfer only.

As explained above in FIG. 4, application authentication elements may be generated and transactions may be initiated through accessing databases and modules located at a payment processing network. Accordingly, although FIG. 7 is directed to person-to-person transactions initiated by a mobile communication device directly communicating with a server computer via a telecommunications network, the payment processing network may be used for application and user authentication for any type of transaction. As such, communication between a mobile communication device operating a mobile payment application 740 and a payment processing network server computer 750 may be accomplished through relaying messages through the access device 103 and acquirer computer 104 or directly through a telecommunications network 107, as described above.

FIG. 7 is a flow diagram of a mobile payment transaction 700 according to an exemplary embodiment of the present invention involving a user 730, mobile payment application 740, payment processing network server computer 750, and an issuer server computer 760. The transaction may be processed between a mobile communication device comprising a mobile payment application 740 and a payment processing network server computer 750 communicating through a telecommunication network 107.

Figure 12:
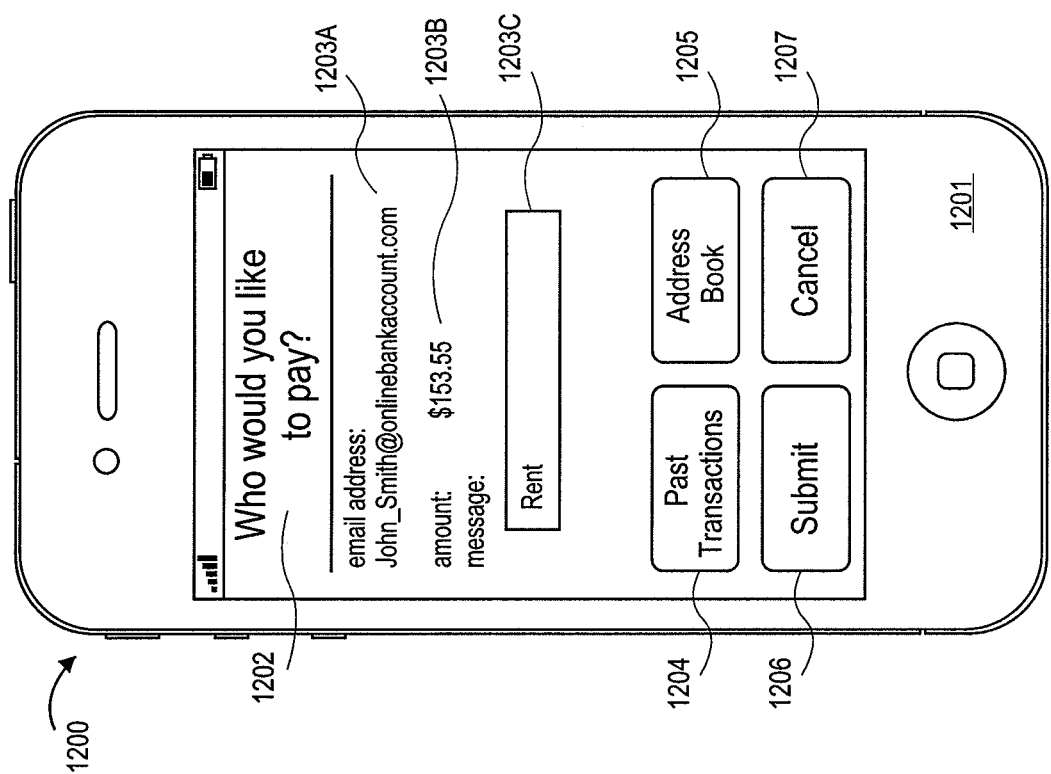
FIG. 12 shows an exemplary user interface of a mobile payment application showing a transaction request displayed on a mobile communication device according to one embodiment of the invention.

In step 701, the user 730 launches a mobile payment application 740 on a mobile communication device. FIG. 12 shows one illustration of an exemplary embodiment of displaying a request to launch the mobile payment application where the transaction (a person-to-person transaction) is initiated by the user. The user is provided with a request to provide transaction information 1202, transaction information that has been entered by the user 1203 including recipient identity or account number 1203-A, transaction amount 1203-B, and message to include with the payment 1203-C.

In step 702, the mobile communication device generates a payment application launch message. The payment application launch message may inform the user 730 that the payment application is being launched and may include information related to the issuer of the associated account registered with the mobile payment application 740 or any other appropriate data. The launch message may also include advertisements or information related to new services being provided by the mobile payment application 740 or any other entity.

In step 703, the user 730 inputs transaction information. In some embodiments, the transaction information may include an email address, contact details, account and routing number for a recipient's bank account, online bank account number (e.g. paypal account), or other payment account information. The transaction may be to a person whose contact information or payment account number is already known by the application and thus the user 730 only has to input a recipient's name or look up the contact information on the mobile payment application 740. Furthermore, the transaction may be a person-to-person transaction so that an account number is not necessary. Instead, only an email address of the recipient, transaction amount, and any details related to the transaction are required. Once the user 730 inputs the transaction information, the user 730 may submit the transaction information.

In step 704, the mobile payment application 740 sends transaction information to the payment processing network. Once the user 730 submits the transaction, the mobile payment application 740 may initiate the transaction by sending transaction information to a payment processing network. The transaction information may be included in an application authentication request message that may be a single message or a series of messages. The transaction information may include enough transaction information to complete a transaction or enough transaction information to identify the user 730 or the mobile communication device the user 730 is operating. The identifying information may contain transaction data and identifying information so that the server computer 750 may retrieve the appropriate pre-selected authentication element. However, any other data may be included in the user 730 authentication request whether the data is related to the application authentication or not.

In step 705, the server computer 750 receives an application authentication request message. Receiving, by a server computer, an application authentication request message from a mobile communication device may be accomplished through a single message or through a series of messages. Either way, the application authentication request message may contain some information informing the server computer 750 that the originating mobile payment application 740 operating the mobile communication device is requesting an application authentication.

In step 706, the server computer 750 retrieves the appropriate pre-selected authentication element from a pre-selected authentication element database. Retrieving, by the server computer, a pre-selected authentication element from a pre-selected authentication element database involves determining the identity of the user 730 and/or requesting mobile communication device as well as determining where the corresponding pre-selected authentication element is located in the pre-selected authentication element database. The server computer 750 (or a processor within the server computer) may determine the user and/or mobile communication device identity by requesting information from a user and/or mobile communication device registration database. The user and/or mobile communication device registration database may comprise information related to the identify of any originating message or may comprise information related linked user information within the various systems and subsystems within the server computer 750. For example, a server computer 750 may receive a message form a mobile communication device that is identified with a serial number. The server computer 750 may request user information that corresponds to that serial number from the user and/or mobile communication device registration database and receive the user's identification information or may receive information related to where the server computer 750 may find the pre-selected authentication element corresponding to that serial number in the pre-selected authentication element database. Either way, the server computer 750 may retrieve the appropriate pre-selected authentication element that corresponds to the user or the mobile communication device that the user is operating.

In step 707, the server computer 750 (or a processer within the server computer) generates an application authentication element comprising a pre-selected authentication element and transaction data associated with a transaction conducted by the mobile communication device. Generating, by the server computer, an application authentication element comprising a pre-selected authentication element and transaction data associated with a transaction conducted by the mobile communication device may be accomplished by an application authentication element generation module located on the server computer 750. The application authentication element generation module may comprise a transaction data selector module or the transaction data selector module may be a separate module on the server computer 750.

The transaction data selector module selects transaction data from the received transaction information in the application authentication request message to include in the application authentication element. The selector module may select the transaction data from the transaction information randomly or selectively such that the same type of information is always chosen. Additionally, as described above, the transaction data may be portions of a transaction record that are combined such that the transaction data could include, for example, both a merchant name and a transaction amount. Accordingly, once the transaction data selector module has selected the transaction data, the transaction data is provided to the application authentication element generation module. It is also worth noting that the transaction data selector module may be implemented on the mobile communication device such that the server computer 750 receives only transaction data that is to be included in the application authentication element.

Once the application authentication element generation module has retrieved both the pre-selected authentication element and the transaction data, the application authentication element generation module generates the application authentication element using the retrieved information. As explained above, the application authentication element generation module may generate the application authentication element in any suitable manner and the generation of the application authentication element will be different for each type of application authentication element generated.

In step 708, the server computer 750 sends an application authentication response message comprising the application authentication element to the mobile communication device. Sending, by the server computer, an application authentication response message comprising the application authentication element to the mobile communication device may involve multiple messages or a single message. The application authentication response message may also include any other data whether the data is related to the application authentication or not. For example, the application authentication response message may also include information related to the type of user authentication that the server computer 750 has stored for the identified user or mobile communication device being operated by the user 730.

In step 709, the application authentication response message is received by the mobile communication device and the mobile payment application 740 displays or plays the included application authentication element to the user 730. The user 730 may now look at or hear the application authentication element in order to determine whether they recognize their pre-selected authentication element, in entirety or portion, along with the relevant transaction data. FIG. 14 shows an exemplary embodiment of a mobile communication device 1401 displaying an application authentication element 1403 comprising both a pre-selected authentication element 1404 and transaction data 1405 where the pre-selected authentication element 1404 is an image.

In step 710, the user 730 confirms the application authentication element as containing their pre-selected authentication element and dynamic transaction data that the user 730 recognizes as pertinent to the transaction. In some embodiments the application authentication element may not require the user 730 confirm the application authentication element as being received. In those embodiments, the mobile payment application 740 would display or play the application authentication element for a pre-determined amount of time and then the user 730 would be prompted to enter their user authentication token whether or not the user recognized their pre-selected authentication element within the application authentication element.

In step 711, the mobile payment application 740 prompts the user 730 to select a type of user authentication. Similar to the step of prompting the user to select a type of user authentication described in FIG. 6 above, the user 730 may or may not be prompted to determine their preferred type of user authentication if the server computer 750 has determined a preferred type of user authentication for the user. FIG. 15 shows an exemplary embodiment of a mobile communication device 1501 prompting a user to select a type of user authentication (1503-1509). In FIG. 15, the type of user authentication options include a swipe 1503, a typed word or phrase 1504, voice 1505, drawing a picture 1506, fingerprint 1507, handwriting recognition 1508, and a movement or position 1509. Additionally, the mobile payment application or sever computer may choose a type of user authentication for the user and merely ask for the user authentication token.

In step 712, the user 730 selects a type of user authentication. The user 730 may make the selection through any appropriate means. For example, on a mobile communication device with a touchscreen, the user 730 may select one of the available options for the type of user authentication.

In step 713, the mobile payment application 740 prompts the user 730 to enter a user authentication token based on the type of user authentication selected. This process is similar to the prompting of the user to enter their user authentication token described above related to FIGS. 5 and 6. Additionally, FIGS. 16-18 show exemplary user interfaces 1600, 1700, 1800 prompting a user to enter a user authentication token 1602, 1702, 1802 for different types of user authentication (a swipe 1603, voice recognition 1703, and a movement or position 1803) displayed on a mobile communication device 1601, 1701, 1801 according to one embodiment of the invention.

In step 714, the user 730 enters the user authentication token using the mobile communication device inputs. Depending on the type of user authentication selected by the user 730, entering the user authentication token may be very different. This process is similar to the entry of the user authentication token steps of FIGS. 5 and 6, as described above.

In step 715, the mobile payment application 740 generates a secret token that is unknown to the user 730 from the entered user authentication token. Similar to the entrance of the generation of the secret token described in FIGS. 5 and 6, the secret token is generated using the user authentication token and may be very different in form and content depending on the type of user authentication selected or provided to the user 730.

In step 716, the payment processing network server computer 750 receives a secret token that is generated by the mobile communication device using a user authentication token. The payment processing network server computer 750 may receive the secret token in a single message or over multiple messages. Additionally, the message may contain identification information such that server computer 750 can identify the mobile communication device or the user 730 operating the mobile communication device. The message may be routed to a token comparison module in order to authenticate the secret token or there may be a separate module that is specifically oriented to identifying request messages from mobile communication devices. Either way, the identity of the user 730 or the mobile communication device is determined through a similar process as during the application authentication generation process.

In step 717, the server computer 750 retrieves a secret reference token from a secret reference token database that corresponds to the user and/or device registration information. Once the server computer 750 determines the identity of the user 730 and/or the mobile communication device, the token comparison module may retrieve the secret reference token that corresponds to the user 730 or the mobile communication device being operated by the user 730. The secret reference token may be retrieved from the secret reference token database through a similar process as described above or through a different process as one of ordinary skill in art would recognize. Once the server computer 750 retrieves the secret reference token, it is provided to the token comparison module if the token comparison module has not already been involved.

In step 718, the server computer 750 compares the secret token to the secret reference token. Using the token comparison module, the server computer 750 compares the received secret token to the secret reference token retrieved from the secret reference token database. This process is similar to that described in reference to FIG. 6 above but is performed by a token comparison module located at the server computer 750 instead of a processor within a contactless element.

In step 719, the server computer 750 determines whether the secret tokens are correlated. As described above, the determination of whether the secret tokens are sufficiently correlated may also be accomplished through any suitable means. For example, if a correlation or risk factor was determined in the prior step, this correlation factor could be compared to a low or high threshold value in order to determine if the secret tokens are too different to be considered correlated.

In step 720, if the secret token and the secret reference token are not correlated, the server computer 750 sends a denial message to the mobile communication device. The mobile communication device displays the denial message to the user 730 and informs them of the authentication failure. FIG. 20 shows an exemplary embodiment of the denial message 2002 displayed on the mobile communication device 2001.

In step 721, the denial message is displayed on the mobile payment application 740 and thus received by the user 730 and the transaction is terminated. When the mobile payment application 740 receives the denial message, the transaction may be immediately terminated or the user 730 may be allowed to try the transaction again. If the mobile payment application 740 allows a second attempt to process the mobile payment transaction, the process may restart from the first step or the user 730 may be allowed to simply enter the user authentication token again.

In step 722, if the secret token and the secret reference token are correlated, sending a user authorization request message to the issuer server computer 760. Because the payment processing network may already possess the relevant transaction details, the payment processing network may generate and forward an authorization request message to the issuer server computer 760 requesting authorization for the transaction. If the payment processing network server computer 750 needs additional information from the user 730, the payment processing network server computer 750 may also request more information from the user before sending an authorization request message to the issuer computer 760.

In step 723, the issuer computer 760 receives an authorization request message informing the issuer computer that the user 730 has been authenticated through the mobile payment application 740. The authorization request message can have a flag or other indicator indicating that the user has been authenticated by the payment processing network. The issuer computer 760 may then make a transaction authorization decision based on the status of the user account as if processing a typical transaction.

Finally, in step 724, the issuer computer 760 determines that the transaction is allowable and initiates the typical financial transaction process. The issuer computer 760 generates and sends an authorization response message to the user 730 that is displayed on the mobile payment application 740 for the user 730. Accordingly, any other typical transaction processing steps may be conducted including clearance and settlement by the payment processing network.

Depending on how the transaction was originated (through an access device or through a direct person-to-person transaction originated by the user 730), the generation and sending of a transaction authorization response may include different steps. For example, if the transaction was originated through an access device as described in FIG. 6, the issuer would determine whether transaction is allowable (through checking account status, etc.) and would inform a merchant whether the transaction is accepted and authorized.

III. Exemplary User Experience

FIGS. 8-20 are figures illustrating exemplary user interfaces describing the user experience of the mobile payment application according to one embodiment of the invention. The figures show a mobile communication device (a phone) from the perspective of a user using the mobile communication device to perform a transaction.

FIG. 8 shows an exemplary user interface of a mobile payment application during an initialization phase displayed on a mobile communication device 801 according to one embodiment of the invention. In some embodiments, a user may be provided with a pre-selected authentication element without being provided a choice as to the type of pre-selected authentication element that is chosen. However, in some embodiments, a user may be provided with multiple types of pre-selected authentication elements and provided a choice as to the type of pre-selected authentication element. In FIG. 8, the type of pre-selected authentication element allowable includes a sound 803, an image 804, a pattern 805, a video 806, an animation 807, and an icon 808. However, this list is not exhaustive and as explained above, any reproducible, modifiable, and transferable data may be used. Additionally, the mobile payment application or sever computer may choose a pre-selected authentication element for the user and merely show the user the pre-selected authentication element that will be used for future transactions.

Additionally, the user may decide to perform the initialization at another time and cancel the process. The options are presented as touchscreen digital buttons in this example, but any input may be used to input a users selection including voice recognition, analog keyboard, etc. If the user cancels the initialization, the mobile payment application will not receive a confirmation message that a pre-selected authentication element and/or secret token have been stored. Therefore, the next time the mobile payment application is accessed, the initialization or registration process will restart.

Providing multiple types of pre-selected authentication elements provides the advantages of providing users with options as to their most comfortable data format for authentication. Some users may be more comfortable with a certain type of data or prefer one data type over another (e.g. a user that is color-blind may prefer a sound over an image or pattern). Accordingly, embodiments allow users to choose the type of application authentication element they prefer and will be able to recognize easily. Additionally, embodiments of the present invention provide advantages for individuals who have disabilities related to particular senses (e.g. individuals that are blind or deaf) that may not have been able to use prior authentication methods due to their disability.

FIG. 9 shows an exemplary user interface 900 of a mobile payment application during an initialization phase displayed on a mobile communication device 901 where the user has chosen an image as the type of pre-selected authentication element. The mobile communication device 901 may provide the user with multiple options for selecting the type of image to be used as the pre-selected authentication element. In this example, the user may choose an existing picture stored on their phone 903, a pre-loaded photo 905 provided by the mobile payment application, or may take a new picture 904 to set as the pre-selected authentication element. Additionally, the user may be able to upload a picture through an external application or device.

Providing users the ability to use their own pictures stored on the phone provides multiple advantages. First, personal pictures may be easier for user's to remember and recognize. In some embodiments, only portions of a pre-selected authentication element may be used to generate an application authentication element. As such, it is beneficial to use familiar items, people, and places so that the user can easily recognize that the application authentication element does in fact correspond to the user's pre-selected authentication element. Additionally, the more options provided to the user injects additional difficulty for rogue applications to determine what pre-selected authentication element the mobile payment application is using to authenticate the application. Therefore, the more choices left to the consumer, the more robust the pre-selected authentication element may be from subterfuge by a rogue application.

FIG. 10 shows an exemplary user interface of a mobile payment application during an initialization phase displayed on a mobile communication device 1001 where the user has chosen to use one of their pre-existing photos as their pre-selected authentication element. In this example, the user may choose one of 6 different pictures or may cancel and go back to the previous selection menu. FIG. 10 shows an exemplary embodiment of a mobile payment application operating on a mobile communication device 1001 where the user has chosen to use an image from their photo library located on a memory on the mobile communication device

1001. The user is provided with a menu showing the available pre-selected authentication element choices. The available images stored on the memory include two men shaking hands 1003, a car 1004, a plane 1005, a man on a phone 1006, a windmill 1007, and a house 1008. Additionally, next and previous screen buttons 1009, 1010 are provided for accessing further image options that may be available for the user to select as the pre-selected authentication elements. The mobile payment application may only disclose images that are formatted appropriately such that they can be used by the system as a pre-selected authentication element or are modifiable to a format that is usable.

FIG. 11 shows an exemplary user interface of a mobile payment application during an initialization phase displayed on a mobile communication device 1101 where a user has chosen an image of two men shaking hands as their pre-selected authentication element 1103. The mobile payment application may ask the user to confirm their selection 1102 to ensure the selection is not a mistake. Once the user selects yes or confirms their selection 1104, the application may set the image as the pre-selected authentication image in the pre-selected authentication element database or in a secured memory in the mobile communication device 1101.

An exemplary user interface showing an initializing phase of a payment application for setting a user authentication element is not shown in exemplary figures but the process may similar to that of the pre-selected authentication element described above. The user may be presented options regarding the type of user authentication and may be allowed to cancel at any time. Furthermore, if a pre-selected authentication element is stored but the process is canceled during the user authentication initialization phase, the application may either restart the initialization in entirety or other request a user authentication token the next time the application is launched.

FIG. 12 shows an exemplary user interface 1200 for a mobile payment transaction initiation screen for initiating a transaction through a mobile payment application displayed on a mobile communication device 1201. FIG. 12 shows one illustration of this exemplary embodiment of displaying a request to launch the mobile payment application where the transaction (a person-to-person transaction in this case) is initiated by the user. The user may use the mobile payment application to initiate a payment transaction with a third party for any goods or services. These person-to-person transactions can be implemented through bank accounts, credit accounts, and debit accounts. Furthermore, an account number may not be necessary for some types of transactions where an email address is tied to an account.

For example, in FIG. 12, the user has launched the mobile payment application and informed the mobile payment application that they would like to initiate a transaction. The user is provided with a request to provide transaction information 1202, transaction information that has been entered by the user 1203 includes recipient identity or account number 1203-A, transaction amount 1203-B, and message to include with the payment 1203-C. The user has input an email address 1203-A of the recipient that is tied to an online account. However, any identifiable information that allows the application to complete a payment transaction could be input by the user. For example, the mobile payment application may ask the user what type of transaction they would like to initiate and provide different recipient input options depending on the type of transaction (account number, phone number, routing number, online credit transaction, etc.). The user inputs the amount to transfer and may also input a message 1203-C related to the transaction, for example, this transaction is for a rent payment. Additionally, the user may be provided multiple shortcut keys that provide information as to different recipients through an address book 1205 or shortcuts to past transactions 1204 in order to simplify the process for the user. Once the transaction information is input, the user can submit the transaction for processing by pressing the submit button 1206. The user may also cancel the transaction at any time by pressing the appropriate button 1207.

FIG. 13 shows an exemplary user interface 1300 for a mobile payment transaction request screen for agreeing to a transaction that has been initiated by an access device in proximity to the mobile communication device 1301. Unlike FIG. 12, the transaction information has already been input and initiated and the user is merely being asked to accept the mobile payment transaction 1302. The mobile payment transaction request screen shows transaction information 1303 including the identity of the requestor of the payment transaction 1303-A, the amount of the transaction 1303-B, the type of product or service that is being purchased 1303-C, and could also include any other pertinent information to the transaction (e.g. merchant address, time, date, manager ID, customer support number, transaction number, merchant clerk name or number, an option to choose different accounts to use for the transaction, etc.). If the user agrees with the transaction information and wants to proceed with the transaction using the mobile payment application, the user may enter yes or submit or any other agreement button 1304. Additionally, if the user would not like to continue with the transaction, the user may press cancel and the transaction will terminate 1305. Additionally, an option could be presented to the user to pay directly using cash or another payment method in which case the transaction could be transferred back to the access device for regular transaction processing using a credit card or other typical transaction instrument.

FIG. 14 shows an exemplary user interface 1400 for displaying an application authentication element 1403 on a mobile communication device 1401. The user may receive a prompt including an application authentication element 1403 comprising a pre-selected authentication element 1404 and transaction data 1405 associated with a transaction conducted by a mobile communication device 1401. The application authentication element 1403 comprises the pre-selected authentication element 1404 that the user selected during the initialization phase (the picture of the two men shaking hands 1404) as well as transaction data 1405 for the transaction that is currently attempting to be completed (the amount of $153.55 for either rent or the DVD player depending on the embodiment). As such, the application authentication element 1403 reassures the user that the application is authentic and therefore the user may select the continue button 1406 to proceed to entering their user authentication token. However, if the wrong picture or the wrong transaction data was displayed, the user could determine that the application is fraudulent or infected with malware and would enter cancel to terminate the transaction 1407.

FIG. 15 shows an exemplary user interface 1500 for displaying a prompt for a user to enter a type of user authentication for a mobile payment application on a mobile communication device 1501. As discussed above, a user may be given a choice as to the type of user authentication they would like to be authenticated with. In FIG. 15, the type of user authentication options include a swipe 1503, a typed word or phrase 1504, voice 1505, drawing a picture or taking a picture of a familiar item 1506, fingerprint 1507, handwriting recognition 1508, and a movement or position 1509. The types of user authentication may include a swipe, typing, voice recognition, taking a picture of a familiar item, fingerprint verification, handwriting verification, as well as a repeatable or known position or movement. The user may also cancel the transaction at any time. The mobile payment application may store a separate user authentication token for each type of user authentication, for more than one type of user authentication, or for only one type of user authentication. For example, the user during initialization the user may be provided with an option to select the number of different types of user authentication they would like to use. Additionally, the user may not be provided with a choice as to the type of authentication they would like to use and this screen may not be presented to the user. Furthermore, the types of user authentication shown in FIG. 16 are not exhaustive and any repeatable data that may be input into a mobile communication device may be used as a type of user authentication.

FIG. 16 shows an exemplary user interface 1600 showing a prompt for a user to enter a user authentication token for a swipe type of user authentication displayed on a mobile communication device 1601 according to one embodiment of the invention. The user may now enter their user authentication token by swiping the screen with their finger, stylus, or any conductive item. The screen shows 20 different value sections on the touchscreen. Each value section may have a different numerical value associated with it. Therefore, the screen of FIG. 16 may be divided into 20 different value sections, each section shown by a dot on the screen and numbered 01-20. If the user's swipe touches sections 01, 04, 07, 10, and 12 then the secret token could be 0104071012. The secret token may be directly or indirectly derived from the swipe values. For example, these values may be inverted, divided by a value, etc. In either case, the secret token will be derived from the user authentication token and the value will not be displayed to the user. While the screen shows a four by five matrix of value sections, the user may or may not see those value sections depending on the implementation of the system. For example, the user may merely see a blank screen asking for a swipe in broad area. Not showing the value sections may make it harder for malicious or fraudulent applications to determine the secret token because they would not know how many data points or value sections are being activated when a user swipes an area. Furthermore, a user may not be able to use their typical ATM personal identification number as a user authentication token because the value section matrix and the typical personal identification numbers do not match. After the user has completed their swipe, they can redo the swipe, submit the swipe, or cancel.

FIG. 17 shows an exemplary user interface 1700 showing a prompt for a user to enter a user authentication token for a voice recognition type of user authentication displayed on a mobile communication device 1701 according to one embodiment of the invention. Here the user may enter their user authentication token by speaking into a microphone on or connected to the mobile communication device 1701. Voice recognition software or hardware may be used to calculate a secret token that is unknown to the user. The secret token may be related to the content of the spoken statement or may be merely calculated by a repeatable pattern based on the characteristics of the user's voice including pitch, tone, etc. As such, the user authentication token may require a secret statement (shown) or may merely require a sufficiently loud statement of sufficient length to determine the biometric data of the user's voice. In addition, any other biometric identification hardware or software may be implemented as part of the mobile communication device input and output components 204 in order to allow similar recognition of fingerprints, face, iris, and any other biometric indicators.

FIG. 18 shows an exemplary user interface 1800 showing a prompt for a user to enter a user authentication token for a movement or position type of user authentication displayed on a mobile communication device 1801 according to one embodiment of the invention. The mobile communication device 1801 may have components such as accelerometers, inbuilt and/or externally adapted motion sensors, or other components in the mobile communication device's data input and output components, providing the mobile communication device the ability to recognize vertical and horizontal position, orientation, acceleration, and deceleration. Therefore, the mobile communication device can capture a pattern by a sequence of vertical/horizontal positions or movements of the mobile communication device. The user would provide the user authentication token by moving the phone in the pre-determined manner and the components or a program on the mobile communication device would translate those movements into a secret token made up of data output from the components due to the readings during the movement. Accordingly, the user would have no knowledge of the secret token.

FIG. 19 shows an exemplary user interface 1900 showing a result of a successful user authorization token entered by the user according to one embodiment of the invention. As explained above, a secret token may not need to be exactly the same as a secret reference token in order to be correlated and thus accepted by the token comparison module at the server computer or a processor within a contactless element. The secret token and the secret reference token may be compared by any appropriate method to determine whether they are correlated. For example, pattern recognition may be used to determine whether environmental circumstances, a hurried or misguided response, or other external circumstances have changed the user authentication token enough to change the generated secret token too much to still be considered correlated.

The comparison may occur through a correlation or risk factor, an correlation algorithm, or any other appropriate means of determining the similarity of like data streams. Furthermore, the method of comparison may very widely depending on the type of user authentication of the user authentication token. For example, a texted word or statement "I want to pay" entered as the user authentication token may have a very different comparison method than a secret token derived from a user authentication token input through voice recognition software. The amount of variance allowed in a correlation or risk score may vary widely depending on the type of the user authentication used to derive the secret token. For example, small differences like a capital letter instead of a lower case letter and an extra letter or digit stating "I want TO pays" may be too much variation from the secret reference token to be considered correlated. However, if the secret token is derived from a statement using voice recognition software, large variance may be allowed. For example, the system may be able to allow large variation due to background noise, wind, a voice change due to illness, etc.

FIG. 20 shows an exemplary user interface 2000 of a mobile payment application displaying a result of a denied user authorization according to one embodiment of the invention. If the token comparison module on the server computer or processor within a contactless element determines that the secret token and the secret reference token are not correlated, a denial message may be generated and sent to the mobile payment application. The mobile payment application may display the denial message to the user and may allow the user to try again. Additionally, a customer service number may be provided such that if a user believes the denial is in error, they may contact someone immediately.

IV. Technical Benefits

Embodiments of the invention provide the technical benefits of increased security and fraud reduction which result in conserved and more efficient use of system resources. Embodiments of the present invention implement authentication techniques including application authentication and user authentication. Application authentication includes the use of two separate pieces of information, a static preselected authentication element and dynamic transaction data. The use of two separate pieces of information, one of which is stored in a secured location that cannot be accessed by unauthorized applications, increases the difficulty of a rogue application having the ability to create an application authentication element that contains the appropriate information to be authenticated by a user. Furthermore, the use of dynamic data that is relevant to a transaction being undertaken further increases the difficulty of determining the appropriate application authentication element. Additionally, the use of data that is not associated with the payment transaction but is relevant to the user ensures that the application must have known something about the user prior to the transaction, and preferably the user selected or agreed to the type of information to be known. More difficult authentication techniques for providing application authentication messages to users increases the security of mobile payment applications and result in greater fraud reduction. Through limiting access to sensitive information, embodiments of the present invention, directly result in fewer fraudulent transactions where user information has been stolen by rogue applications or malware.

Fraudulent transactions, especially in regards to mobile payment transactions, are a strain on the system resources of payment processing systems. Payment processing networks devote system resources to determining and halting fraudulent transactions before a transaction is completed. The application authentication element ensures that rogue or fraudulent applications cannot trick users into providing their sensitive personal and financial information to the fraudulent applications. This directly affects the number of fraudulent transactions occurring on a payment processing network by limiting access to user personal and financial information that may be used to create fraudulent transactions.

Additionally, improved passcode entry methods are provided by embodiments of the present invention. Users are provided with more types of user authentication inputs as well as provided with types of inputs that do not correspond to any other sensitive account information (e.g. ATM personal identification information). As such, embodiments of the present invention provide further security for users account data by creating secret tokens that are derived from the user authentication tokens but are not provided to the user and may not correspond to any other sensitive account information. As such, embodiments of the present invention further protect user's sensitive information by generating passcodes that are not easily usable if intercepted and do not correspond to other accounts. Accordingly, fewer fraudulent transactions are initiated on a transaction processing system.

Furthermore, some embodiments of the present invention halt transactions where a user cannot be authenticated before the typical transaction process has begun. A mobile payment application may not be activated unless a secret token is correlated to a secret reference token saved in secure memory or on a server computer. The additional layer of security including halting seemingly fraudulent transactions before they are initiated directly saves system resources that would have been used to determine whether those transactions are in fact fraudulent. Large amounts of system resources are expended in tracking down and fixing fraudulent transactions. Accordingly, embodiments of the present invention provide multiple technical benefits.

V. Additional Embodiments

In other embodiments, an electronic wallet may be used to conduct a transaction. An electronic wallet may be used in a variety of transactions, including but not limited to eCommerce, social networks, money transfer/personal payments, mobile commerce, proximity payments, gaming, and/or the like. For example, users may engage in eCommerce via the electronic wallet for retail purchases, digital goods purchases, and utility payments. Users may also, for example, use the electronic wallet to purchase games or gaming credits from gaming websites, and transfer funds to friends via social networks. Further, for example, users may also use the electronic wallet on a smart phone for retail purchases, buying digital goods, NFC/RF payments at point of sale (POS) terminals.

In an exemplary transaction involving an electronic wallet, a consumer may submit an indication to purchase or transfer funds. For example, the consumer may visit a merchant website (e.g., Facebook.com, Amazon.com, etc.), and request to purchase an item from the website, transfer funds to a friend, and/or the like. The merchant website may determine whether the electronic wallet is authorized on its website, and may provide a list of payment options. If the merchant is registered with a electronic wallet server, the electronic wallet server may authorize the merchant to collect consumer credentials for login to the electronic wallet, and the merchant website may prompt the consumer to login to the electronic wallet. Otherwise, the merchant website may request the consumer to provide payment details for alternative payment options (e.g., credit card, debit card, PayPal account).

The consumer may authorize submission of their wallet consumer credentials, such as, but not limited to a Wallet/User ID, a password, and/or the like. For example, the consumer may enter the Wallet/User ID and password into a pop-up window provided from the merchant website and/or electronic wallet server. In another example, the consumer may authorize the merchant website to provide the consumer credentials (e.g., previously stored in HTML5, cookies, etc.), to the electronic wallet server. In yet another example, the consumer may authorize the electronic wallet server, via a remote component running on the merchant website (e.g., a Java applet, etc.) to provide consumer credentials to the electronic wallet server for verification.

When the consumer submits consumer credentials to log into the electronic wallet, the merchant website may forward the consumer credentials and transaction details to the electronic wallet server, which may determine the validity of the consumer credentials. If the consumer's credentials are not valid, the electronic wallet server may deny the payment request and send a notification of denial to the merchant website. In other embodiments, if the consumer provided credentials are valid, the electronic wallet server may process payment from the electronic wallet. For example, the electronic wallet server communicates with the consumer's bank account associated with the electronic wallet and requests a fund transfer of an indicated amount. The electronic wallet server may then store a transaction record.

In some embodiments, after processing the payment, the electronic wallet server sends a payment confirmation notice to the merchant website, which in turn completes the order and stores the transaction record in the database. The merchant website may provide a confirmation page comprising transaction confirmation to the consumer.

VI. Exemplary Computer Apparatuses

Figure 21:
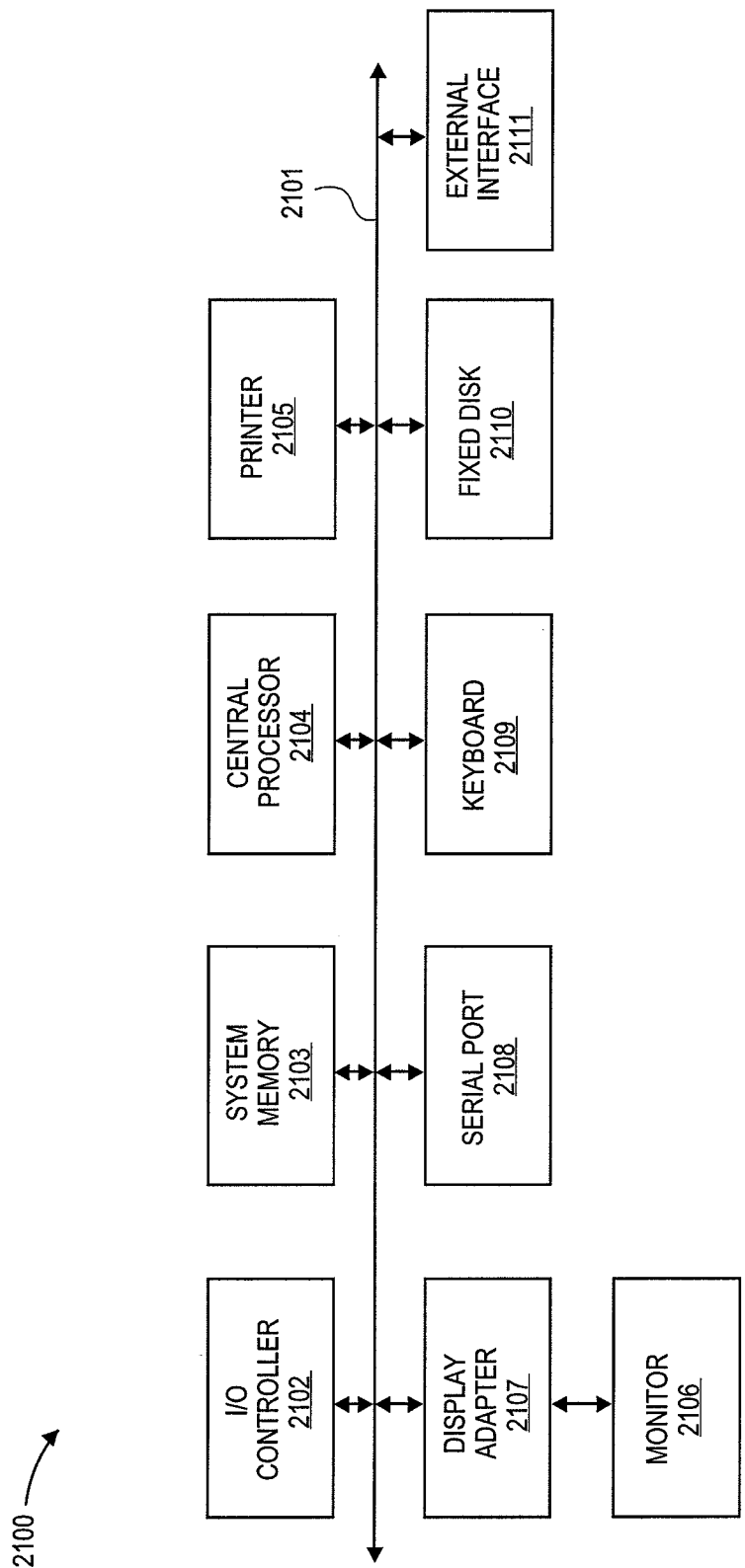
FIG. 21 shows a block diagram of an exemplary computer system according to one embodiment of the present invention.

The various participants and elements of the embodiments may operate one or more computer apparatuses to facilitate the functions described herein. Any of the elements in FIGS. 1-7 may use any suitable number of subsystems to facilitate the functions described herein. Examples of such subsystems or components are shown in FIG. 21. The subsystems shown in FIG. 21 are interconnected via a system bus 2101. Additional subsystems such as a printer 2105, keyboard 2109, fixed disk 2110 (or other memory comprising computer readable media), monitor 2106, which is coupled to display adapter 2107, and others are shown. Peripherals and input/output (I/O) devices, which couple to I/O controller 2102, can be connected to the computer system by any number of means known in the art, such as serial port 2108. For example, serial port 2108 or external interface 2111 can be used to connect the computer apparatus to a wide area network such as the Internet, a mouse input device, or a scanner. The interconnection via system bus allows the central processor 2104 to communicate with each subsystem and to control the execution of instructions from system memory 2103 or the fixed disk 2110, as well as the exchange of information between subsystems. The system memory 2103 and/or the fixed disk 2110 may embody a computer readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention may, therefore, be determined not with reference to the above description, but instead may be determined with reference to the pending claims along with their full scope or equivalents.

What is claimed is:

1. A method comprising:

receiving, at a mobile communication device and from a user, a selection of a first transaction application authentication element to be associated with a transaction application operating on the mobile communication device, the selected first transaction application authentication element validating an authenticity of the transaction application to the user, and wherein the first transaction application authentication element is recognizable by the user;

associating the first transaction application authentication element with the transaction application;

storing the first transaction application authentication element in a secure memory of the mobile communication device;

receiving, by the mobile communication device and from an access device, a transaction request message comprising transaction data;

launching, by the mobile communication device, the transaction application;

providing, by the mobile communication device, a transaction application authentication request;

obtaining, by a processor on the mobile communication device, the selected first transaction application authentication element from the secure memory on the mobile communication device;

generating a second transaction application authentication element by adding the transaction data to the first transaction application authentication element;

providing, by the mobile communication device, the second transaction application authentication element including the transaction data to the user;

receiving, by the mobile communication device, from the user, confirmation that the provided second transaction application authentication element corresponds to the first transaction application authentication element selected by the user for the transaction application;

receiving, by the mobile communication device and from the user, a user authentication token, wherein the user authentication token comprises a repeatable input associated with the user;

responsive to receiving the confirmation of the second transaction application authentication element and receiving the user authentication token, wherein the user authentication token is verified; and conducting a transaction using the transaction application on the mobile communication device.

2. The method of claim 1 wherein after receiving the user authentication token, the method further comprises:

generating, by the mobile communication device, a secret token that is derived from the user authentication token, and transmitting the secret token to a server computer in the transaction, and wherein providing the second transaction application authentication element comprises displaying the selected second transaction application authentication element.

3. The method of claim 1 wherein the user authentication token is in a form of a swipe.

4. The method of claim 1 wherein the transaction data is associated with the transaction conducted by the mobile communication device.

5. The method of claim 1 wherein providing the transaction application authentication request comprises:
transmitting, a request to a server computer to obtain the first transaction application authentication element.

6. A mobile communication device comprising:
an antenna;
a processor; and
a non-transitory computer-readable storage medium comprising instructions that when executed by the processor causes the processor to perform a method comprising:
receiving, from a user, a selection of a first transaction application authentication element to be associated with a transaction application operating on the mobile communication device, the selected first transaction application authentication element validating an authenticity of the transaction application to the user, and wherein the first transaction application authentication element is recognizable by the user;
associating the first transaction application authentication element with the transaction application;
storing the first transaction application authentication element in a secure memory of the mobile communication device;
receiving, by the mobile communication device and from an access device, a transaction request message comprising transaction data;
launching the transaction application;
providing a transaction application authentication request;
obtaining the selected first transaction application authentication element from the secure memory on the mobile communication device;
generating a second transaction application authentication element by adding the transaction data to the first transaction application authentication element;
providing the second transaction application authentication element including the transaction data to the user;
receiving, from the user, confirmation of the second transaction application authentication element;
receiving, from the user, a user authentication token, wherein the user authentication token comprises a repeatable input associated with the user;
responsive to receiving the confirmation that the provided second transaction application authentication element corresponds with the first transaction application authentication element selected by the user for the transaction application; and
receiving the user authentication token, conducting a transaction using the transaction application on the mobile communication device.

7. The mobile communication device of claim 6 wherein the first transaction application authentication element is an image.

8. The mobile communication device of claim 7, wherein the user authentication token is in a form of a swipe.

9. The mobile communication device of claim 6 wherein the transaction data comprises a transaction amount associated with the transaction conducted by the mobile communication device.

10. The mobile communication device of claim 6 wherein providing the transaction application authentication element request comprises:
transmitting a request to a server computer to obtain the first transaction application authentication element.

11. The method of claim 1, further comprising:
prompting, by the mobile communication device, the user to select a type of user authentication.

12. The method of claim 1, further comprising:
generating, a secret token based upon the user authentication token.

13. The method of claim 1, wherein the transaction application comprises a mobile payment transaction application, and wherein the mobile payment transaction application provides the first transaction application authentication element and receives the user authentication token, and wherein the method further comprises:
generating, by the mobile payment transaction application, a secret token.

14. The method of claim 1, wherein the transaction application is a mobile payment transaction application, and wherein the mobile payment transaction application provides the first transaction application authentication element and receives the user authentication token, and wherein the method further comprises:
generating, by the mobile payment transaction application, a secret token; and
providing, by the mobile payment transaction application, the generated secret token to the secure memory in the mobile communication device.

15. The method of claim 14, further comprising:
comparing, by the mobile communication device, the generated secret token with a secret reference token.

16. The method of claim 15, further comprising:
determining that the generated secret token and the secret reference token match; and
generating an approval message.

17. The method of claim 16, further comprising:
transmitting, by the mobile communication device the approval message to the access device.

18. The method of claim 17, wherein the mobile communication device and the access device communicate via NFC.

* * * * *